(12) United States Patent
Kang et al.

(10) Patent No.: US 11,770,167 B2
(45) Date of Patent: Sep. 26, 2023

(54) METHOD OF BEAMFORMING IN ELECTRONIC DEVICE AND ELECTRONIC DEVICE

(71) Applicant: Samsung Electronics Co., Ltd., Suwon-si (KR)

(72) Inventors: Mingyu Kang, Suwon-si (KR); Seunghan Seo, Suwon-si (KR); Woochul Jeong, Suwon-si (KR); Euichang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 16/969,870

(22) PCT Filed: Jul. 17, 2020

(86) PCT No.: PCT/KR2020/009476
§ 371 (c)(1),
(2) Date: Aug. 13, 2020

(87) PCT Pub. No.: WO2021/045380
PCT Pub. Date: Mar. 11, 2021

(65) Prior Publication Data
US 2023/0100555 A1    Mar. 30, 2023

(30) Foreign Application Priority Data
Sep. 3, 2019 (KR) .................. 10-2019-0109130

(51) Int. Cl.
*H04B 7/06* (2006.01)
*H04B 17/12* (2015.01)
*H04B 7/0456* (2017.01)

(52) U.S. Cl.
CPC ......... *H04B 7/0617* (2013.01); *H04B 7/0456* (2013.01); *H04B 17/12* (2015.01)

(58) Field of Classification Search
CPC .... H04B 17/12; H04B 7/0617; H04B 7/0456; H04B 7/0408; H04B 7/06
(Continued)

(56) References Cited

U.S. PATENT DOCUMENTS 6,252,867 B1 * 6/2001 Pfeil .................. G01S 5/12
370/335
2008/0144751 A1    6/2008 Xia et al.
(Continued)

FOREIGN PATENT DOCUMENTS

KR    10-2005-0074220 A    7/2005
KR    10-1038814 B1    6/2011
(Continued)

OTHER PUBLICATIONS

Mingming Cai et al. "Beamforming Codebook Compensation for Beam Squint with Channel Capacity Constraint," 2017 EEE International Symposium on Information Theory (ISIT), Aug. 15, 2017.
(Continued)

*Primary Examiner* — Leila Malek
(74) *Attorney, Agent, or Firm* — Jefferson IP Law, LLP

(57) ABSTRACT

An electronic device is provided. The electronic device includes an antenna module, a memory, and at least one processor configured to, in response to modulating a signal for transmitting by a first carrier frequency, identify a first beam book corresponding to the first carrier frequency stored in the memory, the first beam book including information related to a first phase value corresponding to each of antenna elements included in the antenna module, perform beamforming based on the identified first beam book via the antenna module, in response to modulating the signal for transmitting by a second carrier frequency different from the first carrier frequency, identify a second beam book corresponding to the second carrier frequency, the second beam book including information related to a second phase value corresponding to each of the antenna elements, the second phase value is a value compensated from the first phase value based on the second carrier frequency, and perform beamforming based on the identified second beam book via the antenna module.

20 Claims, 14 Drawing Sheets

(58) Field of Classification Search
USPC .......................................................... 375/267
See application file for complete search history.

(56) References Cited

U.S. PATENT DOCUMENTS

| | | |
|---|---|---|
| 2009/0066595 A1* | 3/2009 | Barker ................... H01Q 1/246 |
| | | 343/757 |
| 2011/0032150 A1 | 2/2011 | Park et al. |
| 2014/0192916 A1 | 7/2014 | Gomadam et al. |
| 2015/0289281 A1 | 10/2015 | Kim et al. |
| 2018/0262918 A1 | 9/2018 | Zhao et al. |
| 2019/0082332 A1 | 3/2019 | Raghavan et al. |

FOREIGN PATENT DOCUMENTS

| | | |
|---|---|---|
| KR | 10-2014-0096489 A | 8/2014 |
| KR | 10-2019-0048787 A | 5/2019 |

OTHER PUBLICATIONS

International Search Report and written opinion dated Oct. 15, 2020 issued in International application No. PCT/KR2020/009476.

* cited by examiner

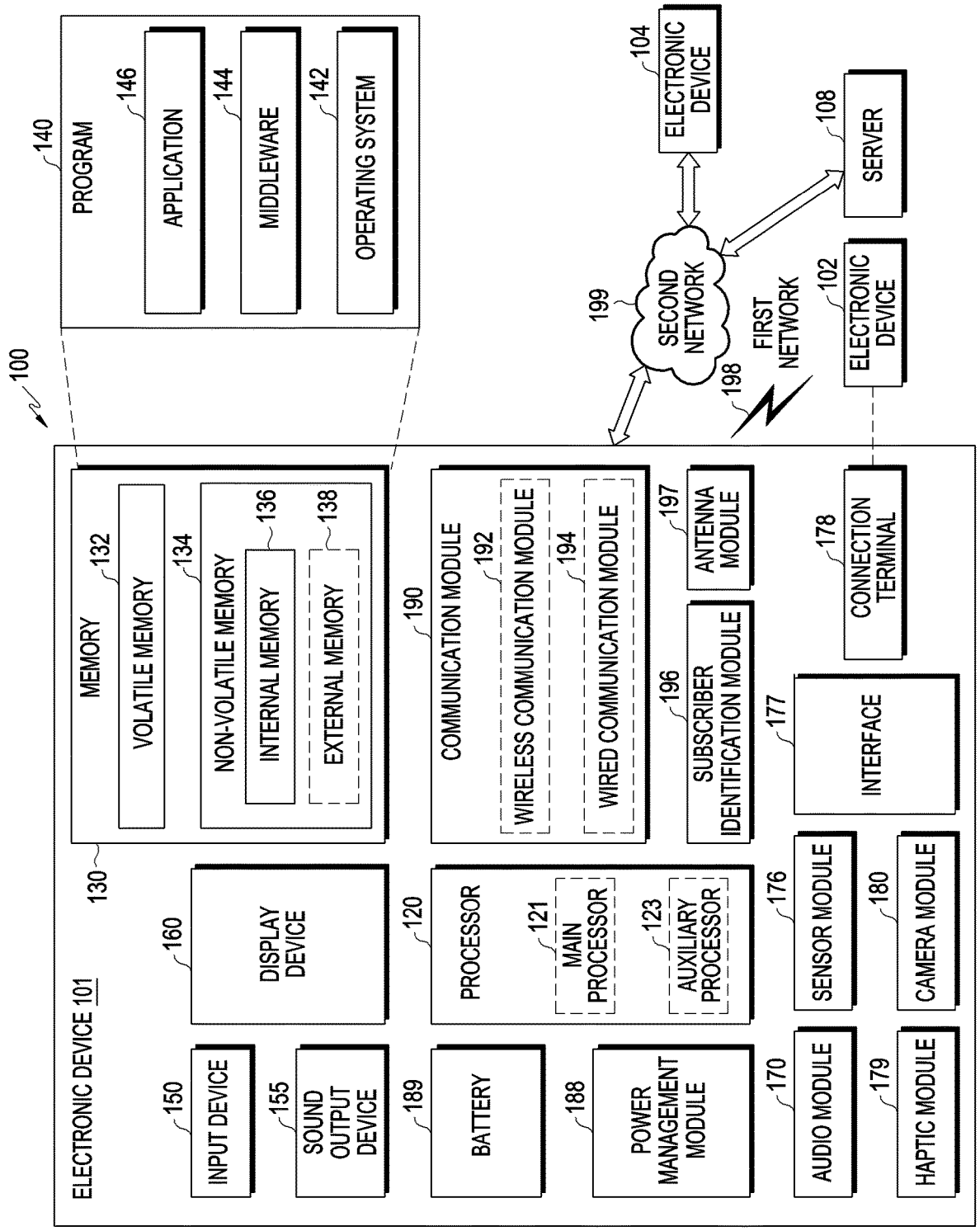

| Band | fc [GHz] | Δℓ[mm] | θ [°] | φ0[°] | φ1[°] | φ2[°] | φ3[°] | φ4[°] | φ5[°] |
|---|---|---|---|---|---|---|---|---|---|
| n261 | 26.5 | 1 | 0 | 0 | 31.8 | 63.6 | 95.4 | 127.2 | 159.0 |
| | | | 30 | 0 | 27.5 | 55.1 | 82.6 | 110.2 | 137.7 |
| | | | 60 | 0 | 15.9 | 31.8 | 47.7 | 63.6 | 79.5 |
| | 28.0 | | 0 | 0 | 33.6 | 67.2 | 100.8 | 134.4 | 168.0 |
| | | | 30 | 0 | 29.1 | 58.2 | 87.3 | 116.4 | 145.5 |
| | | | 60 | 0 | 16.8 | 33.6 | 50.4 | 67.2 | 84.0 |
| | 29.5 | | 0 | 0 | 35.4 | 70.8 | 106.2 | 141.6 | 177.0 |
| | | | 30 | 0 | 30.7 | 61.3 | 92.0 | 122.6 | 153.3 |
| | | | 60 | 0 | 17.7 | 35.4 | 53.1 | 70.8 | 88.5 |
| | 26.5 | 2 | 0 | 0 | 63.6 | 127.2 | 190.8 | 254.4 | 318.0 |
| | | | 30 | 0 | 55.1 | 110.2 | 165.2 | 220.3 | 275.4 |
| | | | 60 | 0 | 31.8 | 63.6 | 95.4 | 127.2 | 159.0 |
| | 28.0 | | 0 | 0 | 67.2 | 134.4 | 201.6 | 268.8 | 336.0 |
| | | | 30 | 0 | 58.2 | 116.4 | 174.6 | 232.8 | 291.0 |
| | | | 60 | 0 | 33.6 | 67.2 | 100.8 | 134.4 | 168.0 |
| | 29.5 | | 0 | 0 | 70.8 | 141.6 | 212.4 | 283.2 | 354.0 |
| | | | 30 | 0 | 61.3 | 122.6 | 183.9 | 245.3 | 306.6 |
| | | | 60 | 0 | 35.4 | 70.8 | 106.2 | 141.6 | 177.0 |

FIG.7

METHOD OF BEAMFORMING IN ELECTRONIC DEVICE AND ELECTRONIC DEVICE

CROSS-REFERENCE TO RELATED APPLICATION(S)

This application is a U.S. National Stage application under 35 U.S.C. § 371 of an International application number PCT/KR2020/009476, filed on Jul. 17, 2020, which is based on and claimed priority of a Korean patent application number 10-2019-0109130, filed on Sep. 3, 2019, in the Korean Intellectual Property Office, the disclosure of which is incorporated by reference herein in its entirety.

BACKGROUND

1. Field

The disclosure relates to methods of beamforming in electronic devices and electronic devices.

2. Description of Related Art

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on a millimeter wave (mmWave) band, such as, e.g., a band ranging from 6 GHz to 60 GHz. To mitigate pathloss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

For example, 5G wireless communication systems may use multiple antenna-based beamforming technology to overcome high signal attenuation upon transmission and reception of signals on an mmWave frequency band (above 6 GHz). Beamforming is a method to maximize the signal transmission/reception gain in the direction to be oriented by adjusting the phase per antenna. To that end, an electronic device according to various embodiments may use a beam book that contains information regarding multiple beams pre-designed to be oriented in different directions. The electronic device may dynamically select the optimal beam from among the multiple beams constituting the beam book depending on the current wireless channel context via beam management upon signal transmission/reception with a base station and use it for beamforming.

In a wireless communication system, such as of 3rd generation partnership project (3GPP) new radio (NR), several frequency bands may be supported, and one frequency band may include various carrier frequencies. If the carrier frequency being currently in use for the electronic device to transmit and receive signals to/from the base station differs from the carrier frequency configured upon initially creating the beam book, the beam actually formed may differ in beam direction and beamforming gain from the beam intended upon creating the beam book.

The above information is presented as background information only to assist with an understanding of the disclosure. No determination has been made, and no assertion is made, as to whether any of the above might be applicable as prior art with regard to the disclosure.

SUMMARY

Various respective aspects and features of the disclosure are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

Aspects of the disclosure are to address at least the above-mentioned problems and/or disadvantages and to provide at least the advantages described below. Accordingly, an aspect of the disclosure is to provide a method of beamforming in an electronic device and the electronic device which may provide an additional phase compensation per antenna considering the current carrier frequency when the electronic device performs beamforming based on a beam book previously stored therein.

Additional aspects will be set forth in part in the description which follows and, in part, will be apparent from the description, or may be learned by practice of the presented embodiments.

In accordance with an aspect of the disclosure, an electronic device is provided. The electronic device includes an antenna module, a memory, and at least one processor configured to, in response to modulating a signal for transmitting by a first carrier frequency, identify a first beam book corresponding to the first carrier frequency stored in the memory, the first beam book including information related to a first phase value corresponding to each of antenna elements included in the antenna module, perform beamforming based on the identified first beam book via the antenna module, in response to modulating the signal for transmitting by a second carrier frequency different from the first carrier frequency, identify a second beam book corresponding to the second carrier frequency, the second beam book including information related to a second phase value corresponding to each of antenna elements, the second phase value is a value compensated from the first phase value based on the second carrier frequency, and perform beamforming based on the identified second beam book via the antenna module.

In accordance with another aspect of the disclosure, an electronic device is provided. The electronic device includes an antenna module, a memory, and at least one processor configured to, in response to modulating a signal for transmitting by a first carrier frequency, identify a beam book corresponding to the first carrier frequency stored in the memory, the beam book including information related to a phase value corresponding to each of antenna elements included in the antenna module, perform beamforming based on the identified beam book via the antenna module, in response to modulating the signal for transmitting by a second carrier frequency different from the first carrier frequency, identify a phase compensation value per antenna element, determined based on the second carrier frequency from each phase value included in the beam book, and perform beamforming based on the identified phase compensation value per antenna element, via the antenna module.

In accordance with another aspect of the disclosure, an electronic device is provided. The electronic device includes an antenna module, a memory, and at least one processor configured to, in response to modulating a signal for transmitting by a first carrier frequency, identify a first beam book corresponding to the first carrier frequency stored in the memory, the first beam book including information related to a phase value corresponding to each of antenna elements included in the antenna module, perform beamforming based on the identified first beam book via the antenna module, in response to modulating the signal for transmitting by a second carrier frequency different from the first carrier frequency, identify a reference frequency in a frequency band corresponding to the second carrier frequency, identify a phase compensation value per antenna element, determined based on the second carrier frequency from each phase value included in a beam book configured for the reference frequency, and perform beamforming based on the identified phase compensation value per antenna element, via the antenna module.

In accordance with another aspect of the disclosure, a method of beamforming by an electronic device is provided. The electronic device includes in response to modulating a signal for transmitting by a first carrier frequency, identifying a first beam book corresponding to the first carrier frequency stored in a memory, the first beam book including information related to a first phase value corresponding to each of antenna elements included in an antenna module, performing beamforming based on the identified first beam book via the antenna module, in response to modulating the signal for transmitting by a second carrier frequency different from the first carrier frequency, identifying a second beam book including information related to a second phase value corresponding to each of antenna elements, the second phase value is a value compensated from the first phase value based on the second carrier frequency, and performing beamforming based on the identified second beam book via the antenna module.

Other aspects, advantages, and salient features of the disclosure will become apparent to those skilled in the art from the following detailed description, which, taken in conjunction with the annexed drawings, discloses various embodiments of the disclosure.

It is an aim of certain embodiments of the disclosure to solve, mitigate or obviate, at least partly, at least one of the problems and/or disadvantages associated with the prior art. Certain embodiments aim to provide at least one of the advantages described below.

BRIEF DESCRIPTION OF THE DRAWINGS

The above and other aspects, features and advantages of certain embodiments of the disclosure will be more apparent from the following description taken in conjunction with the accompanying drawings, in which:

FIG. 1 is a view illustrating an electronic device in a network environment according to an embodiment of the disclosure;

FIG. 7 is a table illustrating a phase compensation value per antenna element depending on a carrier frequency according to an embodiment of the disclosure;

Throughout the drawings, like reference numerals will be understood to refer to like parts, components, and structures.

DETAILED DESCRIPTION

Figure 2A:
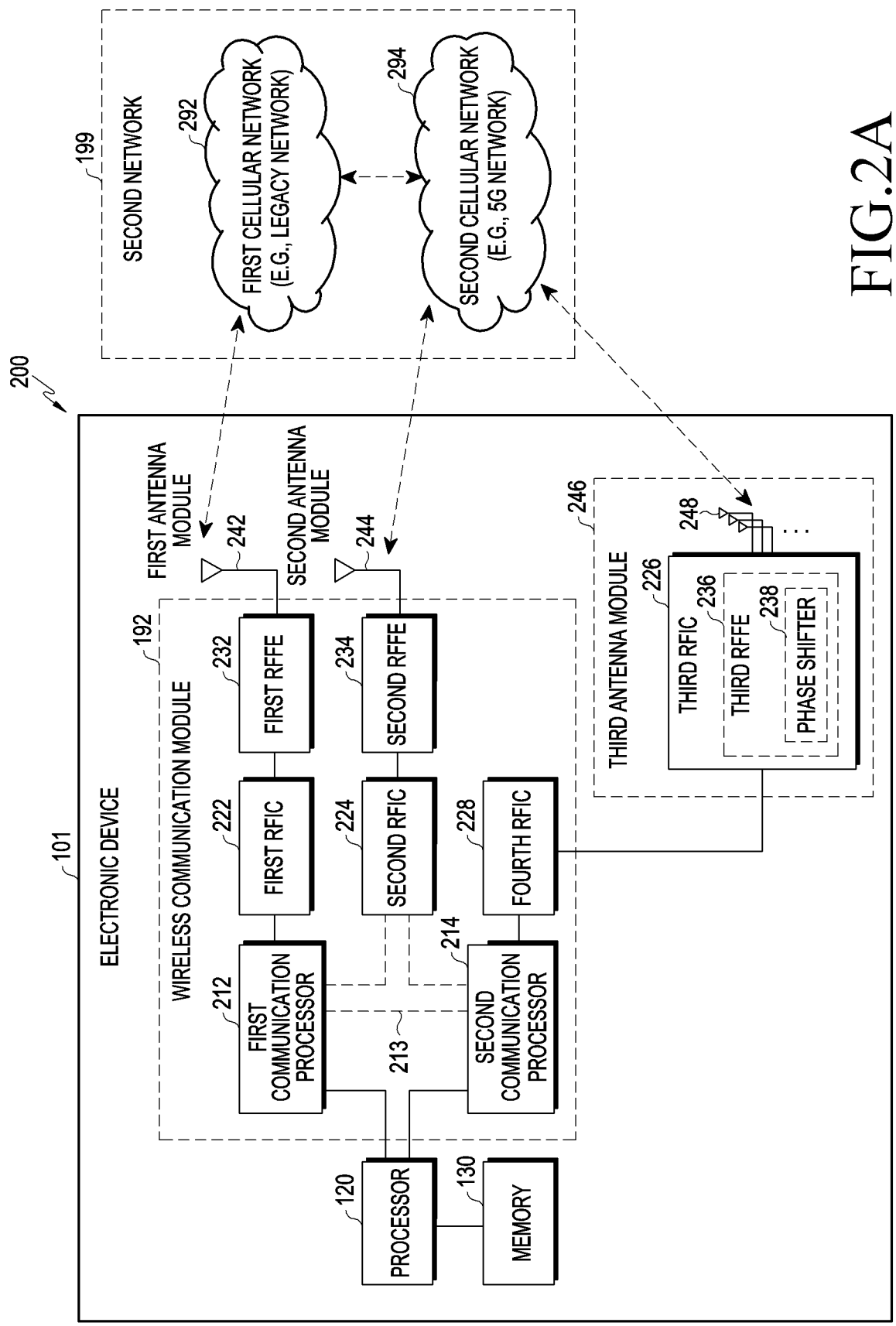
FIG. 2A is a block diagram illustrating an electronic device for supporting legacy network communication and a $5^{th}$ generation (5G) network communication according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used herein are provided merely to describe some embodiments thereof, but not to limit the disclosure. The terms as used herein are provided merely to describe some embodiments thereof, but not to limit the scope of other embodiments of the disclosure. Unless otherwise defined, all terms including technical and scientific terms used herein have the same meaning as commonly understood by one of ordinary skill in the art to which the embodiments of the disclosure pertain and should not be interpreted as overly broad or narrow. As used herein, terms wrong or inappropriate for representing the spirit of the disclosure may be replaced with and understood as more proper ones to represent the spirit of the disclosure by one of ordinary skill in the art. General terms as used herein should be interpreted in the context of the specification or as defined in dictionaries.

As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, operations, components, parts, or combinations thereof as set forth herein.

As used herein, the terms "first" and "second" may be used to describe various components, but the components should not be limited by the terms. The terms are used to distinguish one component from another. For example, a first component may be denoted a second component, and vice versa without departing from the scope of the disclosure.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

Hereinafter, embodiments of the inventive concept will be described with reference to the accompanying drawings. The same reference denotations may be used to refer to the same or substantially the same elements throughout the specification and the drawings. No duplicate description of the same elements is given herein. When determined to make the subject matter of the disclosure unclear, the detailed description of the known art or functions may be skipped. The accompanying drawings are provided for an easier understanding of the spirit of the reception but the disclosure should not be limited thereby. It should be interpreted that the spirit of the disclosure may encompass all other changes, equivalents, or replacements of those shown in the drawings.

A terminal is described herein with reference to the drawings. However, the mobile station may also be referred to as an electronic device, mobile station (MS), mobile equipment (ME), user equipment (UE), user terminal (UT), subscriber station (SS), wireless device, handheld device, or access terminal (AT). Further, the terminal may be a device with communication functionality, such as a mobile phone, personal digital assistant (PDA), smartphone, wireless modem, or laptop computer.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 187 In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108 ) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 187 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 187 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2A is a block diagram 200 illustrating an electronic device for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor (CP) 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228. may be omitted or be included as part of the third RFIC 226.

The first CP 212 may establish a communication channel of a band that is to be used for wireless communication with the first cellular network 292 or may support legacy network communication via the established communication channel. According to an embodiment, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an US-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first CP 212 and the second CP 214 may be implemented in a single chip or a single package. According to an embodiment, the first CP 212 or the second CP 214, along with the processor 120, an assistance processor 123, or communication module 190, may be formed in a single chip or single package.

Figure 2B:
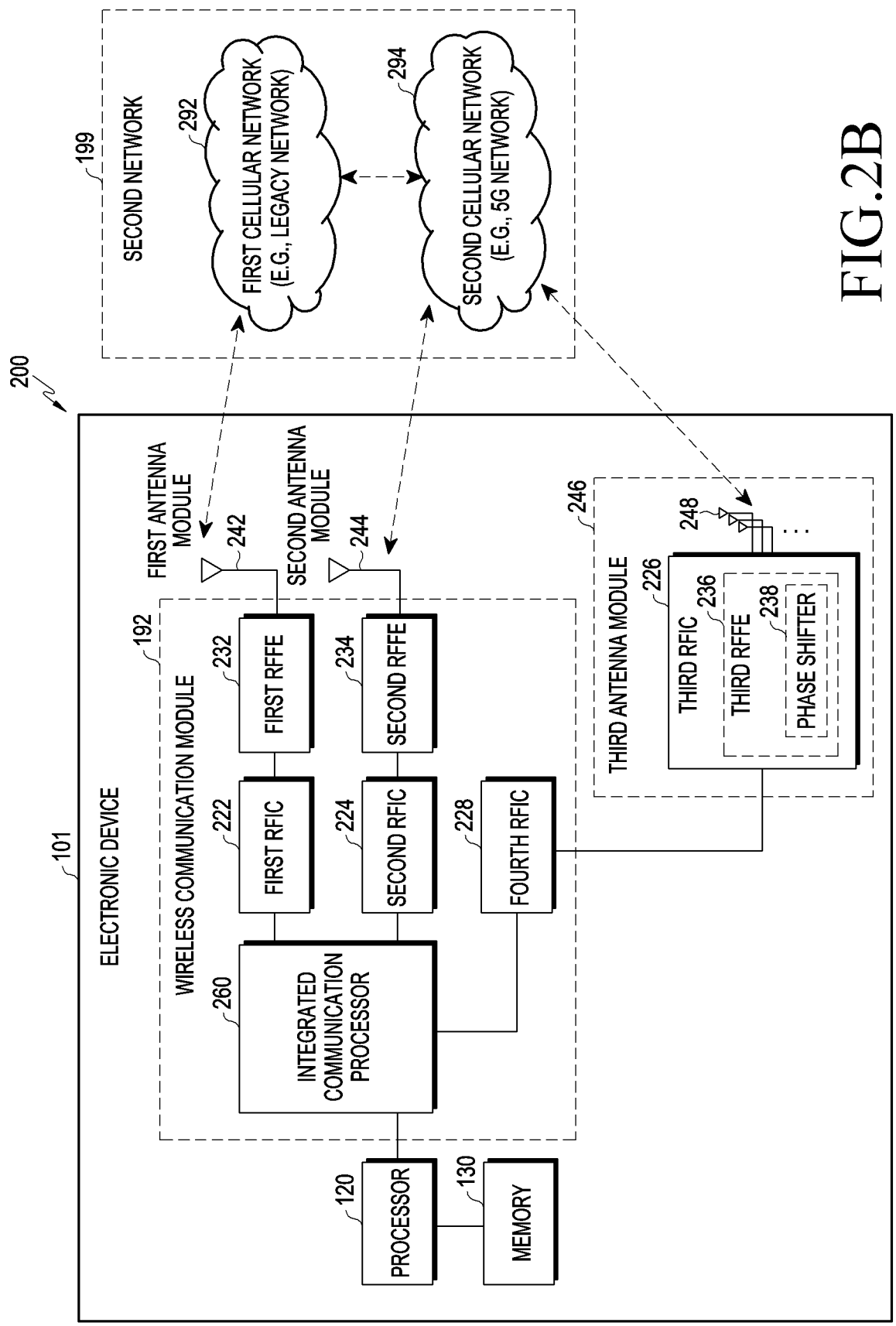
FIG. 2B is a block diagram illustrating an electronic device for supporting legacy network communication and a 5G network communication according to an embodiment of the disclosure.

FIG. 2B is a block diagram illustrating an electronic device for supporting legacy network communication and a 5G network communication according to an embodiment of the disclosure.

Referring to FIG. 2B, an integrated communication processor 260 may support all of the functions for communication with the first cellular network 292 and the second cellular network 294.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 101 may include the fourth RFIC 192. separately from, or as at least part of, the third RFIC 226. In this case, the fourth RFIC 192. may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 192. may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first CP 212, or the second CP 214).

Figure 3:
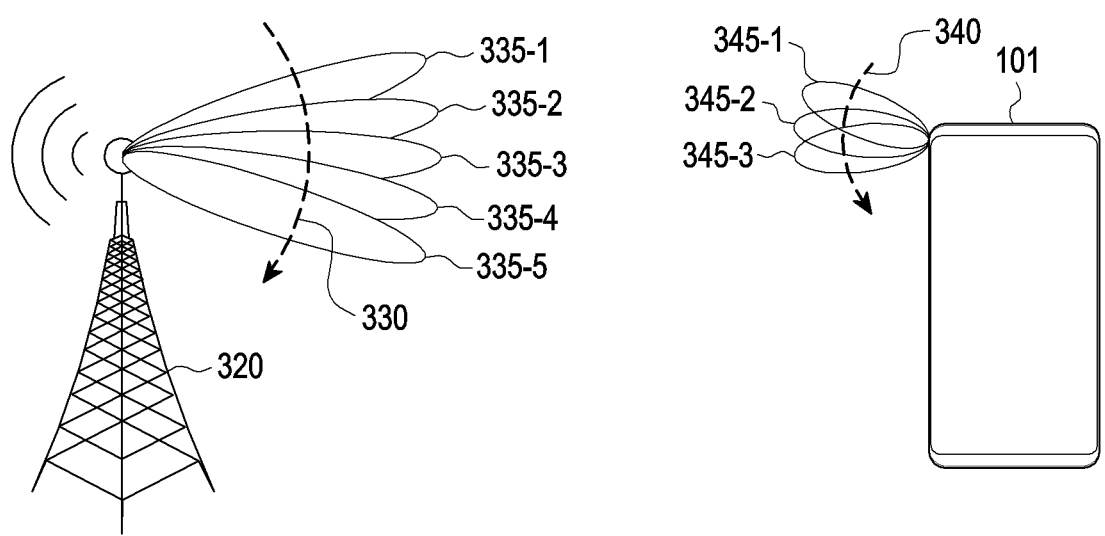
FIG. 3 is a view illustrating an operation for wireless communication connection between a base station and an electronic device according to an embodiment of the disclosure.

FIG. 3 illustrates an embodiment of an operation for wireless communication connection between an electronic device and a base station according to an embodiment of the disclosure.

Referring to FIG. 3, first, a base station (i.e., gNodeB (gNB), transmission reception point (TRP)) 320 may perform beam detection with the electronic device 101 for the wireless communication connection. In the shown embodiment, for beam detection, the base station 320 may sequentially send out a plurality of transmission beams, e.g., a first to fifth transmission beam 335-1 to 335-5 with different directions, thereby performing transmission beam sweeping 330 at least once.

The first to fifth transmission beams 335-1 to 335-5 may include at least one synchronization sequences (SS)/physical broadcast channel (PBCH) block. The SS/PBCH block may be used to periodically measure the channel or beam strength of the electronic device 101.

In another embodiment, the first to fifth transmission beams 335-330 to 335-5 may include at least one channel state information-reference signal (CSI-RS). The CSI-RS is a reference signal that the base station 320 may flexibly configure and may be periodically/semi-persistently or aperiodically transmitted. The electronic device 101 may measure the channel and beam strength using the CSI-RS.

The transmission beams may form a radiation pattern with a selected beam width. For example, the transmission beams may have a broad radiation pattern with a first beam width and a sharp radiation pattern with a second beam width narrower than the first beam width. For example, transmission beams including the SS/PBCH block may have a broader radiation pattern than transmission beams including the CSI-RS.

The electronic device 101 may perform reception beam sweeping 340 while the base station performs transmission beam sweeping 330. For example, while the base station 320 performs first transmission beam sweeping 330, the electronic device 101 may fix a first reception beam 345-1 to a first direction and receive the SS/PBCH block signal transmitted from at least one of the first to fifth transmission beams 335 -1 to 335 -5. While the base station 320 performs second transmission beam sweeping 330, the electronic device 101 may fix a second reception beam 345-2 to a second direction and receive the SS/PBCH block signals transmitted from the first to fifth transmission beams 335-1 to 335-5. As such, the electronic device 101 may select a communicable reception beam (e.g., the second reception beam 345-2 and the third reception beam 345-3) and transmission beam (e.g., the third transmission beam 335-3) based on the result of signal reception operation via the reception beam sweeping 340.

As such, after communicable transmission/reception beams are determined, the base station 320 and the electronic device 101 may transmit and/or receive basic information for cell configuration and configure information for additional beam operation based thereupon. For example, the beam operation information may include information about the configured beam and configuration information about SS/PBCH block, CSI-RS or additional reference signals.

Further, the electronic device 101 may continuously monitor the channel and beam strength using at least one of the SS/PBCH block and CSI-RS included in the transmission beam. The electronic device 101 may adaptively select the beam with good beam quality using the monitoring operation. Optionally, the electronic device 101 may re-perform the beam sweeping operation to determine communicable beams if the electronic device 101 moves or beam is blocked so that the communication connection is released.

Figure 4:
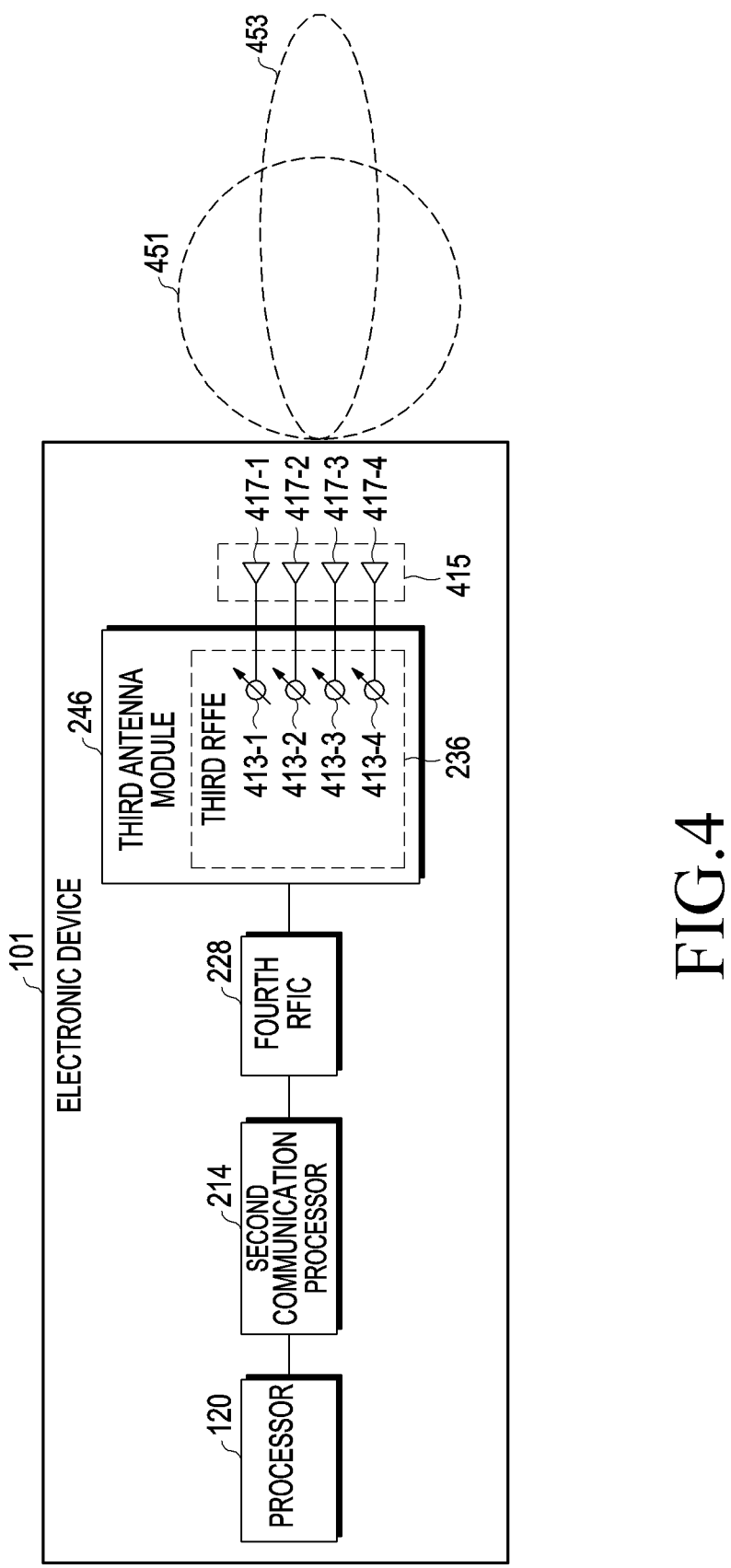
FIG. 4 is a block diagram illustrating an electronic device performing beamforming according to an embodiment of the disclosure.

FIG. 4 is a block diagram illustrating an electronic device for 5G network communication according to an embodiment of the disclosure.

Referring to FIG. 4, the electronic device 101 may include various components as shown in FIG. 2A or 2B. However, for simplicity, FIG. 4 illustrates that the electronic device 101 includes a processor 120, a second communication processor 214, a fourth RFIC 228, and at least one third antenna module 246.

In the shown embodiment, the third antenna module 246 may include a first to fourth phase shifter 413-1 to 413-4 (e.g., the phase shifter 238 of FIG. 2A to 2B) and/or a first to fourth antenna element 417-1 to 417-4 (e.g., the antenna 248 of FIG. 2A or 2B). Each of the first to fourth antenna elements 417-1 to 417-4 may be electrically connected to an individual one of the first to fourth phase shifters 413-1 to 413-4. The first to fourth antenna elements 417-1 to 417-4 may form at least one antenna array 415.

The second communication processor 214 may control the first to fourth phase shifters 413-1 to 413-4, controlling the phase of the signals transmitted and/or received via the first to fourth antenna elements 417-1 to 417-4 and thus generating a transmission beam and/or reception beam in a selected direction.

According to an embodiment, the third antenna module 246 may form a beam 415 with a broad radiation pattern (hereinafter, a "broad beam") and a sharp beam 453 with a sharp radiation pattern (hereinafter, a "sharp beam") as mentioned above, depending on the number of the antenna elements used. For example, if the third antenna module 246 uses all of the first to fourth antenna elements 417-1 to 417-4, the third antenna module 246 may form the sharp beam 453 and, if using only the first antenna module 417-1 and the second antenna element 417-2, the third antenna module 246 may form the broad beam 451. The broad beam 415 has broader coverage than the sharp beam 453 but has a smaller antenna gain and may thus be more effective in beam discovery. In contrast, the sharp beam 453 has narrower coverage than the broad beam 415 but has a larger antenna gain and may thus enhance communication performance.

According to an embodiment, the second communication processor 214 may use the sensor module 176 (e.g., a nine-axis sensor, grip sensor, or global positioning system (GPS)) in beam discovery. For example, the electronic device 101 may adjust the beam discovery position and/or beam discovery period based on the position and/or movement of the electronic device 101 using the sensor module 176. As another example, if the electronic device 101 is gripped by the user, the electronic device 101 may grasp the gripped portion of the user using a grip sensor, thereby selecting an antenna module with relatively better communication performance from among the plurality of third antenna modules 246.

Figure 5A:
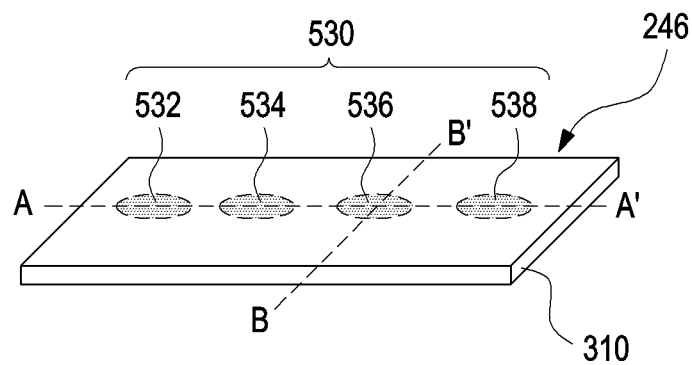
FIGS. 5A, 5B, and 5C are views illustrating a structure of an antenna module according to various embodiments of the disclosure.
Figure 5B:
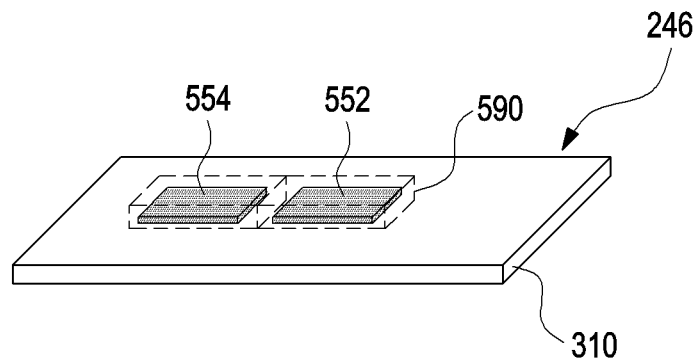
Figure 5C:
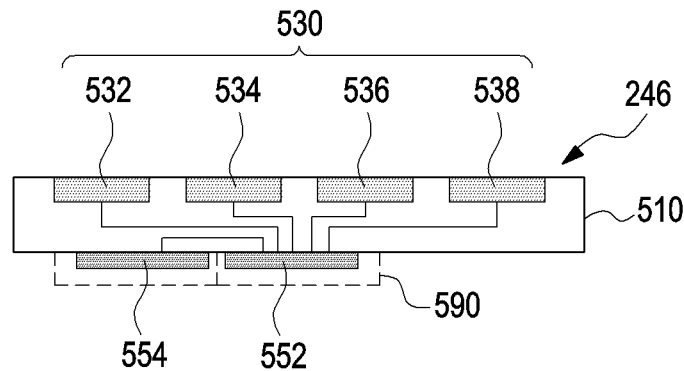

FIGS. 5A, 5B, and 5C illustrate various embodiments of a structure of an antenna module according to an embodiment of the disclosure.

FIG. 5A is a perspective view of the third antenna module 246 as viewed from one side according to an embodiment of the disclosure, and FIG. 5B is a perspective view of the third antenna module 246 as viewed from another side according to an embodiment of the disclosure. FIG. 5C is a cross-sectional view of the third antenna module 246 taken along line A-A'.

Referring to FIGS. 5A, 5B, and 5C, according to an embodiment, the third antenna module 246 may include a printed circuit board 310 or 510, an antenna array 530, a radio frequency integrated circuit (RFIC) 552, and a power management integrated circuit (PMIC) 554. Selectively, the third antenna module 246 may further include a shielding member 590. According to an embodiment, at least one of the above-mentioned components may be omitted, or at least two of the components may be integrally formed with each other.

The PCB 510 may include a plurality of conductive layers and a plurality of non-conductive layers alternately stacked with the conductive layers. The printed circuit board 510 may provide electrical connection between various electronic components arranged on the printed circuit board 510 and/or outside, using wires and conductive vias formed on the conductive layers.

The antenna array 530 (e.g., 248 of FIG. 2A or 2B) may include a plurality of antenna elements 532, 534, 536, or 538 arranged to form directional beams. The antenna elements may be formed on a first surface of the PCB 510 as shown. Alternatively, the antenna array 530 may be formed inside the PCB 510. According to an embodiment, the antenna array 530 may include a plurality of antenna arrays (e.g., a dipole antenna array and/or a patch antenna array) of the same or different shapes or kinds.

The RFIC 552 (e.g., 226 of FIG. 2A or 2B) may be disposed in another area (e.g., a second surface opposite to the first surface) of the PCB 510 which is spaced apart from the antenna array. The RFIC 552 may be configured to be able to process signals of a selected frequency band which are transmitted or received via the antenna array 530. According to an embodiment, upon transmission, the RFIC 552 may convert a baseband signal obtained from a communication processor (e.g., the second communication processor 214) into a designated band of RF signal. Upon receipt, the RFIC 552 may transfer the RF signal received via the antenna array 530 into a baseband signal and transfer the baseband signal to the communication processor (e.g., the second communication processor 214).

According to another embodiment, upon transmission, the RFIC 552 may up-convert an IF signal (e.g., ranging from about 9 GHz to about 11 GHz) obtained from the intermediate frequency integrated circuit (IFIC) (e.g., the fourth RFIC 192. of FIG. 2A or 2B) into a selected band of RF signal. Upon receipt, the RFIC 552 may down-convert the RF signal obtained via the antenna array 552 into an IF signal and transfer the IF signal to the IFIC (e.g., the fourth RFIC 192. of FIG. 2A or 2B).

The PMIC 554 may be disposed in another portion (e.g., the second surface) of the PCB 510 which is spaced apart from the antenna array. The PMIC 554 may receive a voltage from a main PCB (not shown) and provide necessary power to various components (e.g., the RFIC 552) on the antenna module.

The shielding member 590 may be disposed in a portion (e.g., the second surface) of the PCB 510 to electromagnetically shield off at least one of the RFIC 552 or the PMIC 554. According to an embodiment, the shielding member 590 may include a shield can.

Although not shown, the third antenna module 246 may be electrically connected with another PCB (e.g., the main PCB) via the module interface. The module interface may include a connecting member, e.g., a coaxial cable connector, board-to-board connector, interposer, or FPCB. The RFIC 552 and/or the PMIC 554 may be electrically connected with the PCB via the connecting member.

Figure 6:
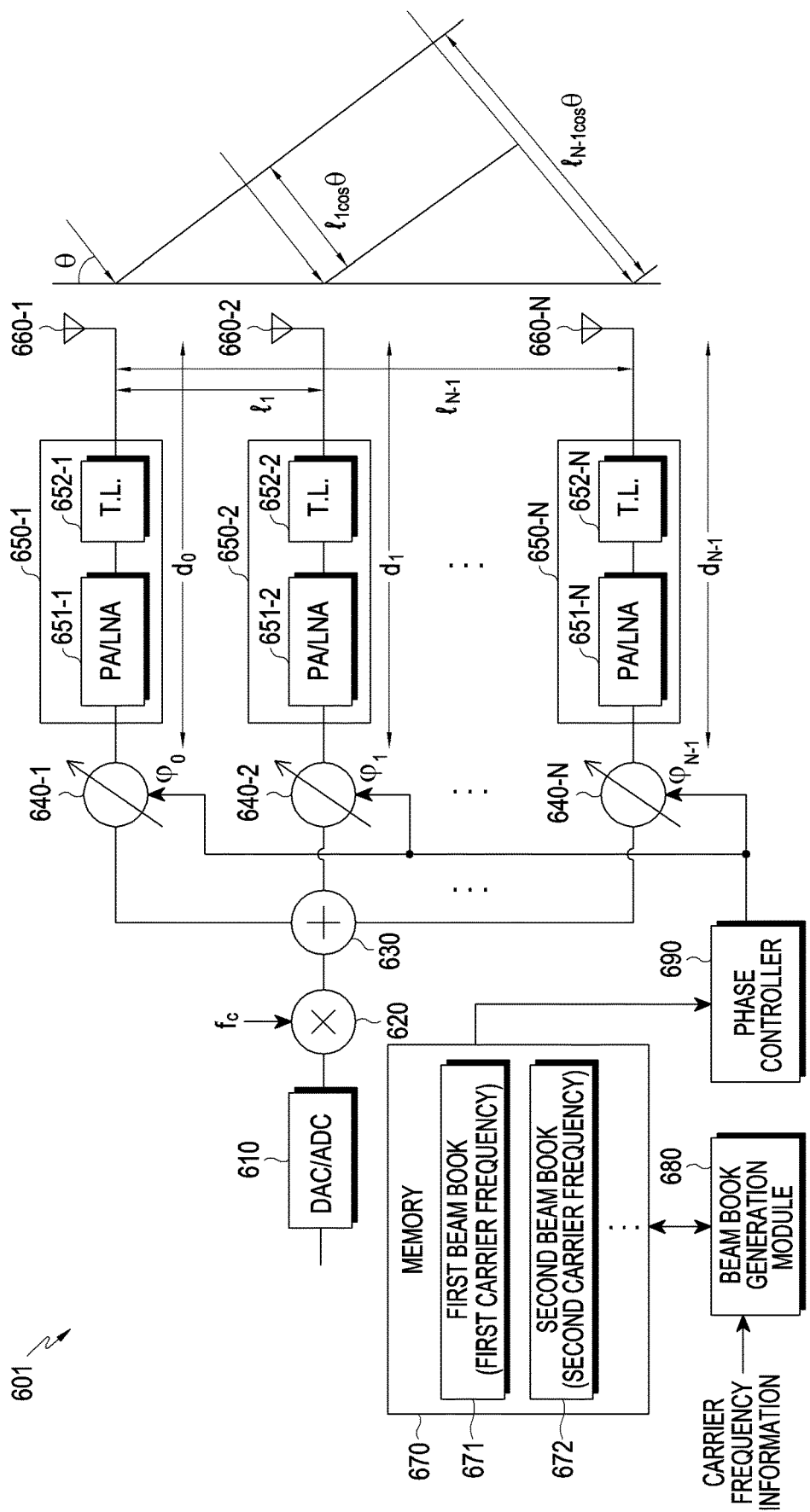
FIG. 6 is a block diagram illustrating an electronic device performing beamforming according to an embodiment of the disclosure.

FIG. 6 is a block diagram illustrating an electronic device performing beamforming according to an embodiment of the disclosure.

Referring to FIG. 6, according to various embodiments, an electronic device 601 (e.g., the electronic device 101) may include at least one of a digital-to-analog converter (DAC)/analog-to-digital converter (ADC) 610, a mixer 620, a combiner/divider 630, phase shifters 640-1 to 640-N, transmission/reception signal processing circuits 650-1 to 650-N, antenna elements 660-1 to 660-N, a memory 670, a beam book generation module 680, or a phase controller 690.

According to various embodiments, the beam book generation module 680 or the phase controller 690 may be included in the processor 120 or second communication processor 214 of FIG. 4. According to various embodiments, the memory 670 may be included in the second communication processor 214 or processor 120 of FIG. 4. According to various embodiments, the memory 670 may be included in a component other than the second communication processor 214 or processor 120 or, as a separate component, may be included in the electronic device 601.

According to various embodiments, the DAC/ADC 610 may be included in the second communication processor 214 or fourth RFIC 192. of FIG. 4. According to various embodiments, the mixer 620 may be included in the fourth RFIC 228, and the combiner/divider 630 may be included in the fourth RFIC 228, and the combiner/divider 630 may be included in the fourth RFIC 192. or the third antenna module 246. According to various embodiments, the phase shifters 640-1 to 640-N and the transmission/reception signal processing circuits 650-1 to 650-N may be included in the third antenna module 246. The phase shifters 640-1 to 640-N may correspond to the phase shifters 413-1 to 413-4 of FIG. 4, and the antenna elements 660-1 to 660-N may correspond to the antenna elements 417-1 to 417-4 of FIG. 4.

According to various embodiments, the transmission (Tx) signal (e.g., an uplink signal) transmitted from the electronic device to the base station may be converted from a digital signal to analog signal via the DAC/ADC 610, mixed with a carrier frequency ($f_c$) by the mixer 620, and frequency-modulated. The transmission signal modulated with the carrier frequency may be distributed in the number (e.g., N) of the antenna elements 660-1 to 660-N via the combiner/divider 630.

According to various embodiments, the transmission signal distributed via the combiner/divider 630 may be signal-processed and transmitted along the transmission path for each antenna element. For example, the signal to be transmitted to a first antenna element 660-1 may be phase-shifted via the first phase shifter 640-1 from the signal distributed by the combiner/divider 630, transmission signal-processed via a first transmission/reception signal processing circuit 650-1, and then transmission-processed via the first antenna element 660-1. The first transmission/reception signal processing circuit 650-1 may include a power amplifier (PA)/low noise amplifier (LNA) 651-1 and a transmission line (TL) 652-1. According to various embodiments, the signal phase-shifted via the first phase shifter 640-1 may be amplified into a preset magnitude of signal via the power amplifier (PA)/low noise amplifier (LNA) 651-1 and may then be transmitted to the first antenna element 660-1 via the TL 652-1.

According to various embodiments, the signal to be transmitted to a second antenna element 660-2 may be phase-shifted via the second phase shifter 640-2 from the signal distributed by the combiner/divider 630, transmission signal-processed via a second transmission/reception signal processing circuit 650-2, and then transmission-processed via the second antenna element 660-2. The second transmission/reception signal processing circuit 650-2 may include a power amplifier (PA)/low noise amplifier (LNA) 651-2 and a transmission line (TL) 652-2. According to various embodiments, the signal phase-shifted via the second phase shifter 640-2 may be amplified into a preset magnitude of signal via the power amplifier (PA)/low noise amplifier (LNA) 651-2 and may then be transmitted to the second antenna element 660-2 via the TL 652-2.

According to various embodiments, the signal to be transmitted to an Nth antenna element 660-N may be phase-shifted via the Nth phase shifter 640-N from the signal distributed by the combiner/divider 630, transmission signal-processed via an Nth transmission/reception signal processing circuit 650-N, and then transmission-processed via the Nth antenna element 660-N. The Nth transmission/reception signal processing circuit 650-N may include a power amplifier (PA)/low noise amplifier (LNA) 651-N and a transmission line (TL) 652-N. According to various embodiments, the signal phase-shifted via the Nth phase shifter 640-N may be amplified into a preset magnitude of signal via the power amplifier (PA)/low noise amplifier (LNA) 651-N and may then be transmitted to the Nth antenna element 660-N via the TL 652-N.

The first phase shifter 640-1 to the Nth phase shifter 640-N each may receive a phase shift-related signal from the phase controller 690 and convert the signal distributed by the combiner/divider 630 into a different phase value depending on the received control signal. The first phase shifter 640-1 to the Nth phase shifter 640-N may adjust the per-antenna element phase of the signals transmitted to the antenna elements 660-1 to 660-N, thereby maximizing the signal transmission/reception gain in the direction to be oriented.

According to various embodiments, 5G wireless communication systems may use multiple antenna-based beamforming technology to overcome high signal attenuation upon transmission and reception of signals on an mmWave frequency band (above 6 GHz) as shown in FIG. 6. The beamforming technology may maximize the signal transmission/reception gain in the direction to be oriented, by adjusting the phase per antenna element 660-1 to 660-N. To that end, the electronic device 601 may store and use a beam book constituted of multiple beams pre-designed to orient in different directions in the memory 670. The electronic device 601 may dynamically select the optimal beam from among the multiple beams constituting the beam book, stored in the memory 670, depending on the current wireless channel context via beam management upon signal transmission/reception with a base station and use it for beamforming.

According to various embodiments, the memory 670 may store a first beam book 671 corresponding to a first carrier frequency. The first beam book 671 may include information related to the phase value corresponding to each antenna element 660-1 to 660-N. According to various embodiments, if the electronic device 601 communicates with the base station at a first carrier frequency, the phase controller 690 may control the phase shift value of the phase shifter 640-1 to 640-N per antenna element 660-1 to 660-N by referring to the first beam book 671 corresponding to the first carrier frequency, stored in the memory 670.

In a case where the electronic device 601 used to communicate with the base station at the first carrier frequency and happens to communicate with the base station at a second carrier frequency, if the phase is controlled according to the first beam book 671, a difference may be made in the beam direction and beamforming gain intended upon creating the beam book. According to various embodiments, if the electronic device 601 communicates with the base station at the second carrier frequency, the beam book generation module 680 may generate a second beam book 672 corresponding to the second carrier frequency based on second carrier frequency information and store the generated second beam book 672 in the memory 670. As the electronic device 601 communicates with the base station using the second carrier frequency, the phase controller 690 may control the phase shift value of the phase shifter 640-1 to 640-N per antenna element 660-1 to 660-N by referring to the second beam book 672 corresponding to the second carrier frequency, stored in the memory 670.

According to various embodiments, as the carrier frequency is changed, the beam book generation module 680 may identify whether the memory 670 stores the beam book corresponding to the changed carrier frequency and, unless the beam book corresponding to the changed carrier frequency is stored, the beam book generation module 680 may store the beam book corresponding to the changed carrier frequency in the memory 670.

According to various embodiments, in a wireless communication system, such as of 3GPP new radio (NR), several frequency bands may be supported, and one frequency band may include various carrier frequencies. In such a system, the carrier frequency currently in use for the electronic device 601 to transmit and receive signals to/from the base station upon performing beamforming may differ from the carrier frequency assumed upon creating the beam book. In this case, the beam actually formed may differ in beam direction and beamforming gain from the beam intended upon creating the beam book.

FIG. 7 is a table illustrating a phase compensation value per antenna element depending on a carrier frequency according to an embodiment of the disclosure.

Referring to FIGS. 6 and 7, it is shown that a plurality of carrier frequencies in an n261 frequency band may be used upon using a linear antenna array of a plurality of antenna elements 660-1 to 660-N disposed at the same interval $\Delta l$ in one dimension for beamforming as shown in FIG. 6.

According to various embodiments, in the n261 frequency band, a plurality of carrier frequencies $f_c$ of 26.5 GHz, 28 GHz, and 29.5 GHz, may be used. FIG. 7 assumes the case where six antenna elements are provided and illustrates the phase ($\varphi_i$ to be compensated for per antenna element depending on the beam orientations ($\theta=0°$, 30°, and 60°) for each of when the interval $\Delta l$ between the antenna elements is 1 mm and when the interval $\Delta l$ is 2 mm. In FIGS. 6 and 7, it is assumed that the same phase shift occurs from the antenna elements 660-1 to 660-N to their respective phase shifters 640-1 to 640-N.

For example, referring to FIGS. 6 and 7, in a case where the inter-antenna element interval $\Delta l$ is 1 mm, and the carrier frequency is 26.5 GHz, for 0°-oriented beamforming, the phase compensation values individually corresponding to the six antenna elements may be 0°, 31.8°, 63.6°, 95.4°, 127.2, and 159.0°, for 30°-oriented beamforming, the phase compensation values individually corresponding to the six antenna elements may be 0°, 27.5°, 55.1°, 82.6°, 110.2°, and 137.7°, and for 60°-oriented beamforming, the phase compensation values individually corresponding to the six antenna elements may be 0°, 15.9°, 31.8°, 47.7°, 63.6°, and 79.5°.

Referring to FIG. 7, even in the same n261 frequency band, the phase compensation value to be compensated for per antenna element may be varied as the carrier frequency is varied and, as the inter-antenna element interval $\Delta l$, the phase compensation value to be compensated for per antenna element may be altered. According to various embodiments, referring to FIG. 7, as the difference in carrier frequency increases, the difference in the phase to be compensated for the beams in the same direction may increase and, thus, if the beam configured corresponding to the first specific carrier frequency is used as it is, the beam actually formed may make a larger difference from the beam originally intended, as the inter-carrier frequency difference increases. The difference may increase as the interval between the multiple antenna elements increases or the number of multiple antennas increases. According to various embodiments, due to the difference in carrier frequency, as the beams actually formed via use of the beam book make a larger difference from the beams intended upon creating the beam book, the beamforming gain applied to the electronic device may reduce, and this may result in deterioration of wireless communication quality and hence a reduction in the transmission rate (throughput) upon data transmission/reception. Although FIG. 7 illustrates the cases where the inter-antenna element interval Δl is 1 mm and 2 mm, if the inter-antenna element interval increases, the phase difference to be compensated for may increase.

According to various embodiments, referring to FIG. 6, the beam book corresponding to each carrier frequency (e.g., 26.5 GHz, 28.0 GHz, and 29.5 GHz) may be generated and stored in the memory 670 by the beam book generation module 680 and, according to the carrier frequency currently in use, the corresponding beam book may be applied to the beamforming. According to various embodiments, whenever the carrier frequency is varied, the beam book generation module 680 may generate a corresponding beam book and apply the beam book to beamforming. A specific embodiment of generating a beam book by the beam book generation module 680 is described below.

A method of applying beamforming to an uplink signal transmitted from the electronic device to the base station has been described above in connection with FIG. 6, and this may apply likewise to a method of applying beamforming to a downlink signal received from the electronic device to the base station.

For example, the signal transmitted from the base station to the electronic device may be received via each antenna element 660-1 to 660-N. According to various embodiments, the signal received via the first antenna element 660-1 may be reception signal-processed via the first transmission/reception signal processing circuit 650-1 and then phase-shifted via the first phase shifter 640-1 according to a phase control signal from the phase controller 690. The first transmission/reception signal processing circuit 650-1 may include a power amplifier (PA)/low noise amplifier (LNA) 651-1 and a transmission line (TL) 652-1. According to various embodiments, the signal received via the first antenna element 660-1 may be transmitted to the PA/LNA 651-1 via the TL 652-1 of the first transmission/reception signal processing circuit 650-1 and be low noise amplification-processed by the PA/LNA 651-1.

According to various embodiments, the signal received via the second antenna element 660-2 may be reception signal-processed via the second transmission/reception signal processing circuit 650-2 and then phase-shifted via the second phase shifter 640-2 according to a phase control signal from the phase controller 690. The second transmission/reception signal processing circuit 650-2 may include a power amplifier (PA)/low noise amplifier (LNA) 651-2 and a transmission line (TL) 652-2 According to various embodiments, the signal received via the second antenna element 660-2 may be transmitted to the PA/LNA 651-2 via the TL 652-2 of the second transmission/reception signal processing circuit 650-2 and be low noise amplification-processed by the PA/LNA 651-2

According to various embodiments, the signal received via the Nth antenna element 660-N may be reception signal-processed via the Nth transmission/reception signal processing circuit 650-N and then phase-shifted via the Nth phase shifter 640-N according to a phase control signal from the phase controller 690. The Nth transmission/reception signal processing circuit 650-N may include a power amplifier (PA)/low noise amplifier (LNA) 651-N and a transmission line (TL) 652-N. According to various embodiments, the signal received via the Nth antenna element 660-N may be transmitted to the PA/LNA 651-N via the TL 652-N of the Nth transmission/reception signal processing circuit 650-N and be low noise amplification-processed by the PA/LNA 651-N.

According to various embodiments, the reception signal phase-shifted via the first phase shifter 640-1 to the Nth phase shifter 640-N may be combined via the combiner/divider 630, and the signal combined via the combiner/divider 630 may be mixed with the carrier frequency $f_c$ via the mixer 620 and be then modulated into a baseband signal. The signal modulated into the baseband signal via the mixer 620 may be converted into a digital signal via the DAC/ADC 610.

According to various embodiments, although FIG. 6 illustrates a single path for the processing path of the transmission signal and the processing path of the reception signal, the transmission signal and the reception signal may be processed via separate distinct paths. According to various embodiments, the DAC/ADC 610 of FIG. 6 may be included in the second communication processor 214 or fourth RFIC 192. of FIG. 4, and the mixer 620 and the combiner/divider 630 may be included in the fourth RFIC 192. of FIG. 4. According to various embodiments, the phase shifters 640-1 to 640-N, transmission/reception signal processing circuits 650-1 to 650-N, and antenna elements 660-1 to 660-N of FIG. 6 may be included in the third antenna module 246 of FIG. 4. The antenna elements 660-1 to 660-N of FIG. 6 may correspond to the antenna elements 417-1 to 417-4 (e.g., the antenna 248 of FIG. 2A or 2B) of FIG. 4.

According to various embodiments, the memory 670 of FIG. 6 may be included in the memory 130 of FIG. 1 or may be included in the processor 120 or second communication processor 214 of FIG. 4 or may be configured as a separate memory. According to various embodiments, the beam book generation module 680 or the phase controller 690 may be included in the processor 120 or second communication processor 214 of FIG. 4 or may be configured as a separate processor or module. According to various embodiments, the beam book generation module 680 or phase controller 690 may be configured in software and be stored in the memory 670, or the beam book generation module 680 or phase controller 690 may be configured as a hardware module.

A specific embodiment of creating a beam book by the beam book generation module 680 is described below, according to various embodiments.

According to various embodiments, the electronic device 601 may create a beam book corresponding to the changed carrier frequency to allow the beam actually formed when the electronic device performs beamforming to be identical to the beam intended upon creating the beam book.

According to various embodiments, the electronic device 601 may store the inter-antenna element intervals ($l_i$) or per-antenna effective distances ($d_i$) in the memory 670 and use the same for creating the beam book. If the inter-antenna element intervals are the same, this may be denoted as Δl.

The per-antenna effective distance ($d_i$) is a distance considering the influences by the transmission line and elements that the signal received by the electronic device 601 undergoes after received by each antenna element 660-1 to 660-N and until it is transmitted to the phase shifter 640-1 to 640-N, and an additional phase shift may occur due to the per-antenna effective distance. According to various embodiments, the electronic device 601 may measure the per-antenna effective distance and store the per-antenna effective distance, along with the carrier frequency ($f_{c,ref}$), which serves as a reference as used upon initially creating the beam book, in the memory 670.

According to various embodiments, if the carrier frequency being currently used when the electronic device 601 performs beamforming to transmit and receive signals to/from the base station differs the carrier frequency $f_{c,ref}$ which serves as the reference used upon initially creating the beam book, the beam book generation module 680 of the electronic device 601 may create a new beam book using at least one value of the reference carrier frequency $f_{c,ref}$, the inter-antenna element interval $I_i$, or the per-antenna effective distance $d_i$ stored in the memory 670, based on the carrier frequency $f_{c,ref} + \Delta f_c$ being currently used.

According to various embodiments, the beam book generation module 680 may predict the phase difference due to the carrier frequency difference occurring per antenna element and perform additional compensation, using together information about the direction ($\theta$ or, if the respective oriented directions of the antenna elements upon creating the beam book differ from each other, $\theta_i$) intended upon creating the initial beam book.

According to various embodiments, if the phase to be compensated for via the beam book corresponding to the existing carrier frequency is $\varphi_{i,ref}$ for any antenna element when the electronic device 601 intends to use any beam in the beam book, the direction $\theta_i$ to be oriented by the corresponding antenna element upon creating the beam book corresponding to the new carrier frequency and the phase ($\varphi_{i,add}$ to be compensated accordingly, and the phase $\varphi_i$ to be compensated finally may be calculated by Equations 1 to 3 below.

$$\theta_i = \cos^{-1}\left(\frac{1}{l_i}\left(\frac{c\phi_{i,ref}}{2\pi f_{c,ref}} - d_i\right)\right) \text{ from } \phi_{i,ref} = \frac{2\pi(l_i\cos\theta_i + d_i)(f_{c,ref})}{c} \quad \text{Equation 1}$$

$$\phi_{i,add} = \frac{2\pi(l_i\cos\theta_i + d_i)(f_{c,ref} + \Delta f_c)}{c} - \phi_{i,ref} \quad \text{Equation 2}$$

$$\phi_i = \phi_{i,ref} + \phi_{i,add} \quad \text{Equation 3}$$

According to various embodiments, the beam book corresponding to the carrier frequency which serves as the initial reference and the beam book newly created corresponding to the currently used carrier frequency by Equations 1 to 3 above may be configured in, e.g., Tables 1 and 2, respectively, below and be stored in the memory 670.

TABLE 1

| beam id | φ0, ref [°] | φ1, ref [°] | ... | φN-1, ref [°] |
|---|---|---|---|---|
| 0 | φ0, ref(0) | φ1, ref(0) | ... | φN-1, ref(0) |
| 1 | φ0, ref(1) | φ1, ref(1) | ... | φN-1, ref(1) |
| ... | | | | |
| M-1 | φ0, ref(M-1) | φ1, ref(M-1) | ... | φN-1, ref(M-1) |

TABLE 2

| beam id | φ0 [°] | φ1 [°] | ... | φN-1 [°] |
|---|---|---|---|---|
| 0 | φ0(0) | φ1(0) | ... | φN-1(0) |
| 1 | φ0(1) | φ1(1) | ... | φN-1(1) |
| ... | | | | |
| M-1 | φ0(M-1) | φ1(M-1) | ... | φN-1(M-1) |

According to various embodiments, Table 1 and Table 2 show an example of the initially stored beam book when the number of antenna elements is N and the number of the beams in the beam book is M and an example of the beam book additionally phase compensated using Equations 1 to 3 above.

According to various embodiments, the phase value to be compensated for each antenna element corresponding to the beam selected from each beam book may be transferred to the phase shifter 640-1 to 640-N using a bit stream by the phase controller 690. For example, if the per-antenna element phases are transferred using B bits, each phase $\varphi$ in each beam book may be mapped to the integer b ($0 \leq b \leq 2^{B-1}$) corresponding to each bit stream as shown in Equation 4 below.

$$\phi \leftrightarrow b \text{ if } \frac{360°}{2^B}b \leq \phi < \frac{360°}{2^B}(b+1) \quad \text{Equation 4}$$

According to various embodiments, given the wavelength values according to variations in carrier frequency, if the number of antenna elements actually used for beamforming is altered, the electronic device 601 may create a new beam book considering again the inter-antenna element interval and/or the number of antenna elements used.

Figure 8:
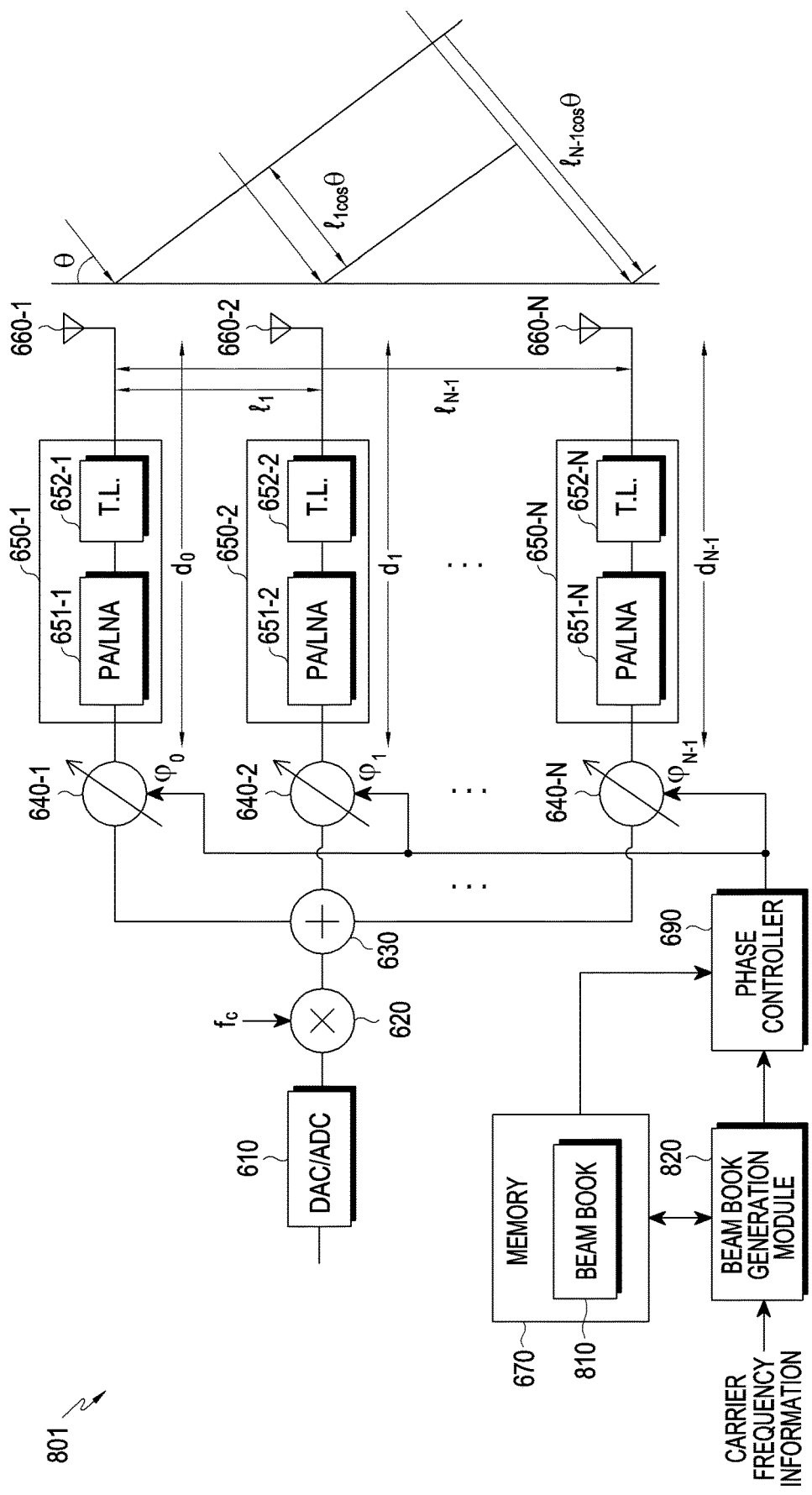
FIG. 8 is a block diagram illustrating an electronic device performing beamforming according to an embodiment of the disclosure.

FIG. 8 is a block diagram illustrating an electronic device performing beamforming according to an embodiment of the disclosure.

Referring to FIG. 8, according to various embodiments, an electronic device 801 (e.g., the electronic device 101) may include at least one of a DAC/ADC 610, a mixer 620, a combiner/divider 630, phase shifters 640-1 to 640-N, transmission/reception signal processing circuits 650-1 to 650-N, antenna elements 660-1 to 660-N, a memory 670, a phase compensation module 820, or a phase controller 690. The components of FIG. 6, which are denoted with the same reference numbers as those of FIG. 6 may perform the same or similar functions to those of FIG. 6. Thus, the same operations as those of FIG. 6 are excluded from the description made with reference to FIG. 8.

According to various embodiments, a beam book 810 corresponding to a carrier frequency (e.g., a first carrier frequency) which is initially a reference may be stored in the memory 670. The beam book 810 may include information related to the phase value corresponding to each antenna element 660-1 to 660-N. According to various embodiments, if the electronic device 801 communicates with the base station at a first carrier frequency, the phase controller 690 may control the phase shift value of the phase shifter 640-1 to 640-N per antenna element 660-1 to 660-N by referring to the beam book 810 corresponding to the first carrier frequency, stored in the memory 670.

According to various embodiments, in a case where the electronic device 801 used to communicate with the base station at the first carrier frequency and happens to communicate with the base station at a second carrier frequency, if the phase is controlled according to the beam book 810 initially configured, a difference may be made in the beam direction and beamforming gain intended upon creating the beam book.

According to various embodiments, if the electronic device 801 communicates with the base station at the second carrier frequency, the phase compensation module 820 may determine a phase compensation value per antenna element from each phase value contained in the beam book 810, based on the second carrier frequency. According to various embodiments, the phase compensation module 820 may determine the phase compensation value per antenna element using Equations 1 to 3 applied upon creating the new beam book in FIG. 6. For example, the phase compensation module 820 of the electronic device 801 may calculate, in real-time, the phase compensation value corresponding to the carrier frequency according to a variation in the carrier frequency and provide the phase compensation value to the phase controller 690. According to various embodiments, the phase compensation module 820 may periodically calculate the phase compensation value corresponding to the carrier frequency and provide the same to the phase controller 690.

According to various embodiments, upon determining the phase compensation value per antenna element by the phase compensation module 820 according to the variation in the carrier frequency, the electronic device 801 may newly calculate a phase ($\varphi_i$ to be compensated for per antenna element according to the orientation ($\theta$=0°, 30°or 60°) of each beam as shown in FIG. 7.

According to various embodiments, in a case where the phase compensation module 820 determines the phase compensation value in real time according to the variation in the carrier frequency, the application of the newly created phase compensation value may be delayed due to a processing delay. In such a case, the phase controller 690 may use the phase compensation value of the existing beam book 810 stored in the memory 670 until the phase compensation module 820 determines a new phase compensation value. If a new phase compensation value is determined by the phase compensation module 820 after the phase of each phase shifter 640-1 to 640-N is controlled, the phase controller 690 may control the phase of each phase shifter 640-1 to 640-N using the phase compensation value newly determined by the phase compensation module 820.

According to various embodiments, in a case where the electronic device operates in a non-stand alone (NSA) mode as shown in FIG. 2A or 2B, the second communication processor 214 (e.g., an NR communication processor) may previously obtain information about the carrier frequency to be altered from the first communication processor 212 (e.g., an LTE communication processor). Thus, in a case where the phase compensation module 820 determines the phase compensation value in real-time according to a variation in the carrier frequency, the phase compensation module 820 may previously obtain information about the carrier frequency to be altered from the first communication processor 212, previously determine the phase compensation value before the carrier frequency is altered, or previously generate a new beam book, thereby preventing a delay in the application of a new phase compensation value due to the processing delay.

Figure 9:
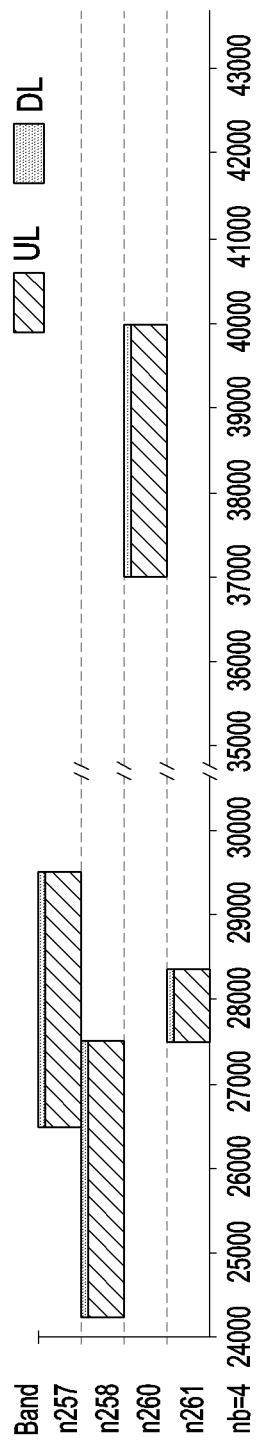
FIG. 9 is a view illustrating a frequency spectrum per frequency band according to an embodiment of the disclosure.

FIG. 9 is a view illustrating a frequency spectrum per frequency band according to an embodiment of the disclosure.

Referring to FIG. 9, according to various embodiments, an electronic device (e.g., the electronic device 601 of FIG. 6 or the electronic device 801 of FIG. 8) may previously store the beam books individually corresponding to various applicable frequency bands in the memory 670 and use the same.

According to various embodiments, four frequency bands of n257, n258 n260, and n261 may be applied for a frequency band not less than 24 GHz as shown in FIG. 9. In such a case, the electronic device may previously store a beam book for 28 GHz and a beam book for 39 GHz in the memory 670 considering the distribution of the frequency bands and may use the same.

According to various embodiments, the electronic device may subdivide the carrier frequency $f_c$ in the n261 frequency band with respect to 1 GHz or 0.5 GHz to enable additional phase compensation even in the frequency band. For example, the electronic device may subdivide the n261 frequency band into 1 GHz or 0.5 GHz units, generate a beam book for each frequency, and store the beam books in the memory 670 and, when the carrier frequency changes into the corresponding frequency, the electronic device may identify the corresponding beam book and apply it in real-time.

According to various embodiments, since each frequency band has a constant frequency spectrum as shown in FIG. 9, the electronic device may set a specific frequency, which serves as a reference, as a reference frequency. The beam book generation module 680 may generate a beam book for the reference frequency per frequency band and store the same in the memory 670 and, when the carrier frequency changes into the corresponding frequency band, newly calculate a phase compensation value using the beam book corresponding to the reference frequency which serves as a reference. According to various embodiments, the reference frequency which serves as a reference may include at least one of the lowest frequency in the frequency band, the highest frequency in the frequency band, the center frequency in the frequency band, or a sub band.

According to various embodiments, the electronic device may separately configure each beam book considering, e.g., carrier aggregation (contiguous CA) between adjacent frequencies or non-contiguous CA in the same frequency band and store the separately configured beam books in the memory 670. According to various embodiments, in each beam book generated and stored in the above-described embodiments, some phase values may be tuned during a test in the manufacturing process.

According to various embodiments, as described above, the electronic device may generate a beam book per carrier frequency or, when each carrier frequency is altered, calculate the difference value for the corresponding carrier frequency using an equation (e.g., Equations 1 to 3) in real-time and apply the same for phase value compensation. According to various embodiments, the electronic device may also apply a method that combines the above-described methods, uses some beam books, and additionally determines a phase compensation value by the equation. For example, the electronic device may generate and store the beam book corresponding to the reference frequency, which serves as a reference, per frequency band and, if there is a difference between the reference frequency and the current carrier frequency, calculate a finer phase compensation value by computation. For example, in a 24 GHz band, the electronic device may reference the pre-generated beam book in 500 MHz units and, in 100 MHz units, perform additional computation based on the beam book to thereby further compensate for the difference in phase compensation value.

An Example 1 of the disclosure may be an electronic device, wherein the electronic device 101 may comprise the third antenna module 246, a memory 670, and a processor 120 or 214 configured to, in response to modulating a signal for transmitting by a first carrier frequency, identify a first beam book 671 corresponding to the first carrier frequency stored in the memory, the first beam book including information related to a first phase value corresponding to each of antenna elements included in the antenna module, perform beamforming based on the identified first beam book via the antenna module, in response to modulating the signal for transmitting by a second carrier frequency different from the first carrier frequency, identify a second beam book 672 corresponding to the second carrier frequency, the second beam book including information related to a second phase value corresponding to each of antenna elements, the second phase value is a value compensated from the first phase value based on the second carrier frequency, and perform beamforming based on the identified second beam book via the antenna module.

An Example 2 may be an electronic device in accordance with example 1, or with any other example described herein, wherein the second beam book may be determined further considering an interval between the antenna elements.

An Example 3 may be an electronic device in accordance with example 1 or example 2, or with any other example described herein, wherein the second beam book may be determined further considering an effective distance between phase shifters each of which corresponds to a respective one of the antenna elements.

An Example 4 may be an electronic device in accordance with example 1 to example 3, or with any other example described herein, wherein the second beam book may be determined further considering a direction in which each antenna element is oriented.

An Example 5 may be an electronic device in accordance with example 1 to example 4, or with any other example described herein, wherein the processor may be further configured to, when the second beam book corresponding to the second carrier frequency is not present, generate the second beam book including information related to the second phase value in which the first phase value corresponding to each antenna element has been compensated for based on the second carrier frequency.

An Example 6 may be an electronic device in accordance with example 1 to example 5, or with any other example described herein, wherein the processor may be further configured to, when the second beam book corresponding to the second carrier frequency is not present, identify a reference frequency in a frequency band corresponding to the second carrier frequency and generate the second beam book including information related to the second phase value in which the first phase value corresponding to each antenna element has been compensated for based on the second carrier frequency from a beam book configured for the reference frequency.

An Example 7 of the disclosure may be an electronic device, wherein the electronic device may comprise an antenna module, a memory, and a processor configured to, in response to modulating a signal for transmitting by a first carrier frequency, identify a beam book corresponding to the first carrier frequency stored in the memory, the beam book including information related to a phase value corresponding to each of antenna elements included in the antenna module, perform beamforming based on the identified beam book via the antenna module, in response to modulating the signal for transmitting by a second carrier frequency different from the first carrier frequency, identify a phase compensation value per antenna element, determined based on the second carrier frequency from each phase value included in the beam book, and perform beamforming based on the identified phase compensation value per antenna element, via the antenna module.

An Example 8 may be an electronic device in accordance with example 7, or with any other example described herein, wherein the phase compensation value may be determined further considering an interval between the antenna elements.

An Example 9 may be an electronic device in accordance with example 7 or example 8, or with any other example described herein, wherein the phase compensation value may be determined further considering an effective distance between phase shifters each of which corresponds to a respective one of the antenna elements.

An Example 10 may be an electronic device in accordance with example 7 to example 9, or with any other example described herein, wherein the phase compensation value may be determined further considering a direction in which each antenna element is oriented.

An Example 11 of the disclosure may be an electronic device, wherein the electronic device may comprise an antenna module, a memory, and a processor configured to, in response to modulating a signal for transmitting by a first carrier frequency, identify a first beam book corresponding to the first carrier frequency stored in the memory, the first beam book including information related to a phase value corresponding to each of antenna elements included in the antenna module, perform beamforming based on the identified first beam book via the antenna module, in response to modulating the signal for transmitting by a second carrier frequency different from the first carrier frequency, identify a reference frequency in a frequency band corresponding to the second carrier frequency, identify a phase compensation value per antenna element, determined based on the second carrier frequency from each phase value included in a beam book configured for the reference frequency, and perform beamforming based on the identified phase compensation value per antenna element, via the antenna module.

An Example 12 may be an electronic device in accordance with example 11, or with any other example described herein, wherein the reference frequency in the frequency band may include at least one of a lowest frequency in the frequency band, a highest frequency in the frequency band, or a center frequency in the frequency band.

An Example 13 may be an electronic device in accordance with example 11 or example 12, or with any other example described herein, wherein the phase compensation value may be determined further considering an interval between the antenna elements.

An Example 14 may be an electronic device in accordance with example 11 to example 13, or with any other example described herein, wherein the phase compensation value may be determined further considering an effective distance between phase shifters each of which corresponds to a respective one of the antenna elements.

An Example 15 may be an electronic device in accordance with example 11 to example 14, or with any other example described herein, wherein the phase compensation value may be determined further considering a direction in which each antenna element is oriented.

Operations of an electronic device, according to various embodiments, are described below with reference to FIGS. 10, 11, 12, and 13.

Figure 10:
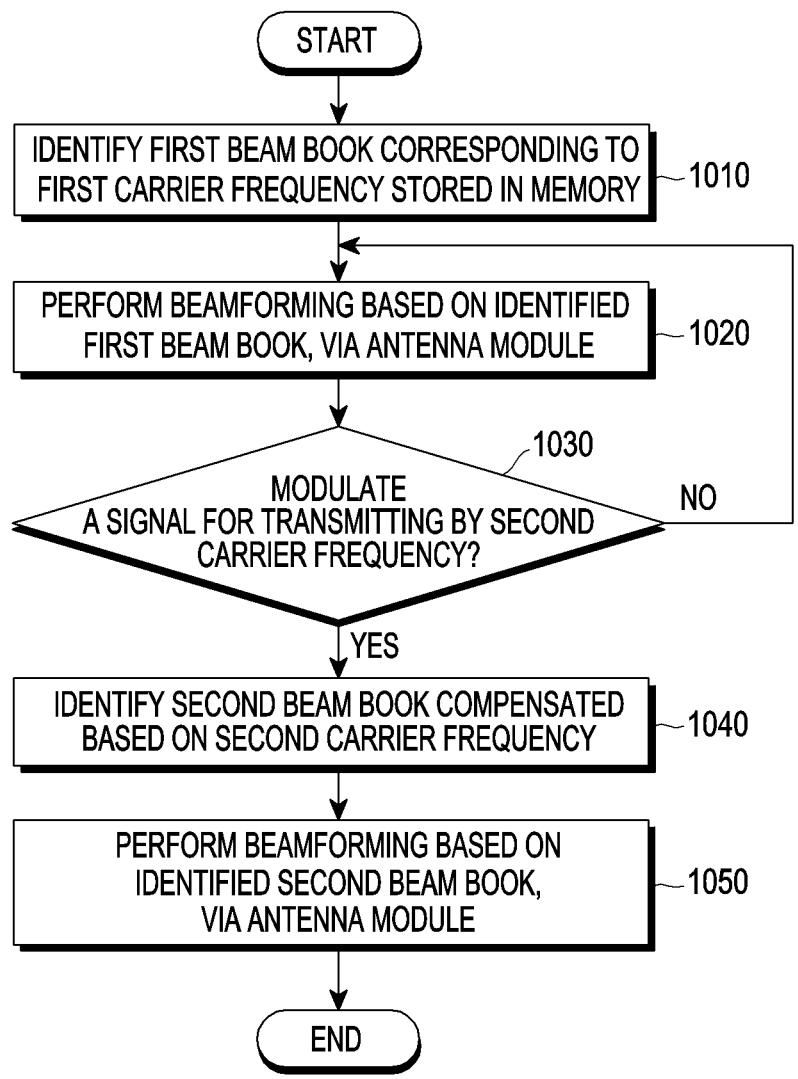
FIG. 10 is a flowchart illustrating a method for operating an electronic device according to embodiment of the disclosure.

FIG. 10 is a flowchart illustrating a method for operating an electronic device according to an embodiment of the disclosure.

Referring to FIG. 10, the electronic device 101 (e.g., the electronic device 601 or 801 of FIG. 6 or 8) (e.g., a processor (e.g., the second communication processor 214) of the electronic device) may identify a first beam book 671 corresponding to a first carrier frequency stored in the memory 670 in operation 1010.

In operation 1020, the electronic device may perform beamforming based on the identified first beam book via the third antenna module 246.

If the electronic device which used to modulate a signal for transmitting by the first carrier frequency and performs beamforming happens to modulate the signal for transmitting by a second carrier frequency and perform beamforming (yes in 1030) in operation 1030, the electronic device may identify a second beam book 672 in which the phase value has been compensated for based on the changed second carrier frequency in operation 1040. According to various embodiments, the case where the electronic device modulates into the second carrier frequency and performs beamforming may include the case where it performs a beam search in the second carrier frequency, the case where it performs a cell search in the second carrier frequency, and the case where it hands over from the first carrier frequency to the second carrier frequency and transmits and receives data, and the case in which the beamforming is carried out is not limited to a specific communication context.

According to various embodiments, when the carrier frequency changes from the first carrier frequency to the second carrier frequency, the electronic device may newly generate the second beam book 672. According to various embodiments, the electronic device may previously store the second beam book 672 for the second carrier frequency applicable to the electronic device and, upon communication using the second carrier frequency, apply the pre-stored second beam book 672. According to various embodiments, if the electronic device modulates into the first carrier frequency and continues to perform beamforming (no in 1030) in operation 1030, the electronic device may continue to perform beamforming based on the first beam book 671 via the third antenna module 246 in operation 1020.

In operation 1050, the electronic device may perform beamforming based on the identified second beam book 672 via the antenna module.

Figure 11:
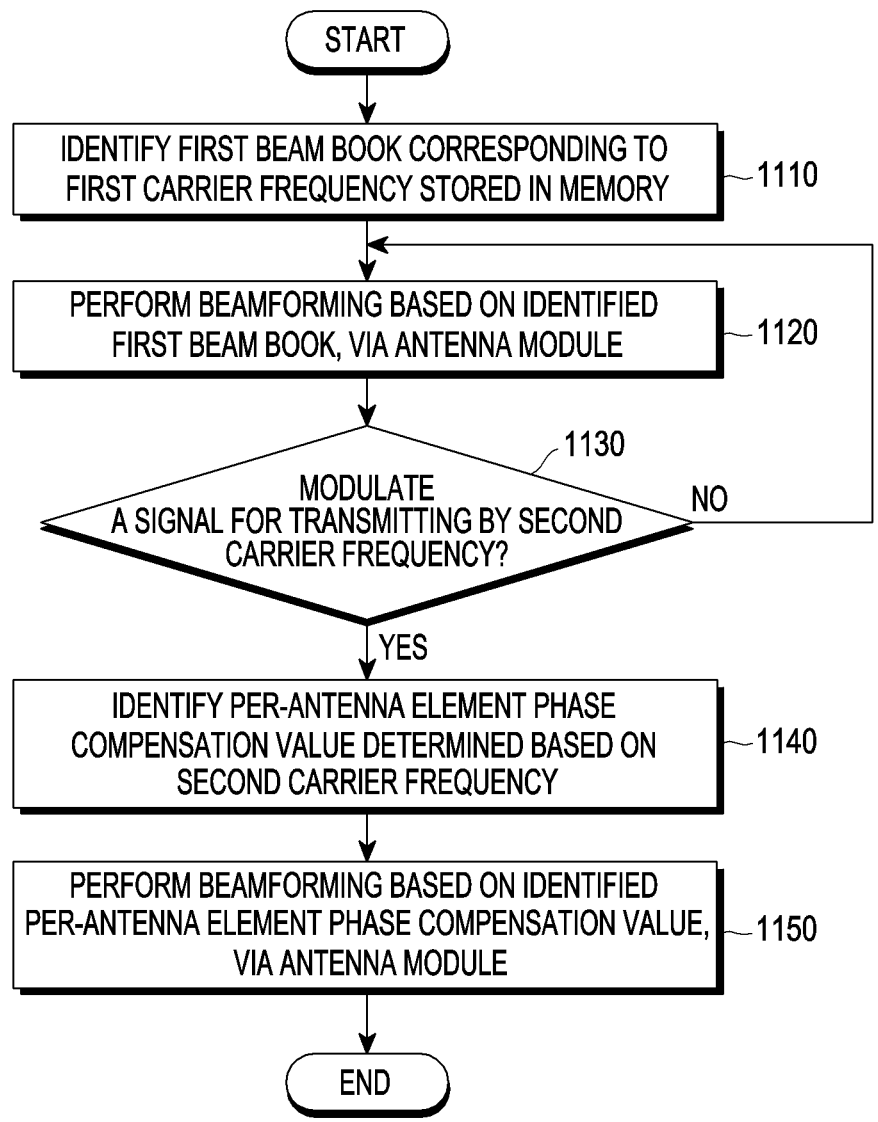
FIG. 11 is a flowchart illustrating a method for operating an electronic device according to an embodiment of the disclosure.

FIG. 11 is a flowchart illustrating a method for operating an electronic device according to an embodiment of the disclosure.

Referring to FIG. 11, the electronic device 101 (e.g., the electronic device 601 or 801 of FIG. 6 or 8) (e.g., a processor (e.g., the second communication processor 214) of the electronic device) may identify a first beam book 671 corresponding to a first carrier frequency stored in the memory 670 in operation 1110.

In operation 1120, the electronic device may perform beamforming based on the identified first beam book 671 via the third antenna module 246.

If the electronic device which used to modulate a signal for transmitting by the first carrier frequency and performs beamforming happens to modulate the signal for transmitting by a second carrier frequency and perform beamforming (yes in 1130) in operation 1130, the electronic device may identify the phase compensation value per antenna element, determined based on the changed second carrier frequency in operation 1140. According to various embodiments, the case where the electronic device modulates into the second carrier frequency and performs beamforming may include the case where it performs a beam search in the second carrier frequency, the case where it performs a cell search in the second carrier frequency, and the case where it hands over from the first carrier frequency to the second carrier frequency and transmits and receives data, and the case in which the beamforming is carried out is not limited to a specific communication context.

According to various embodiments, the per-element phase compensation value may be determined in real-time by a preconfigured equation (e.g., Equations 1 to 3).

In operation 1150, the electronic device may perform beamforming based on the identified phase compensation value per antenna element, via the antenna module.

According to various embodiments, if the electronic device modulates into the first carrier frequency and continues to perform beamforming (no in 1130) in operation 1130, the electronic device may continue to perform beamforming based on the first beam book 671 via the third antenna module 246 in operation 1120.

Figure 12:
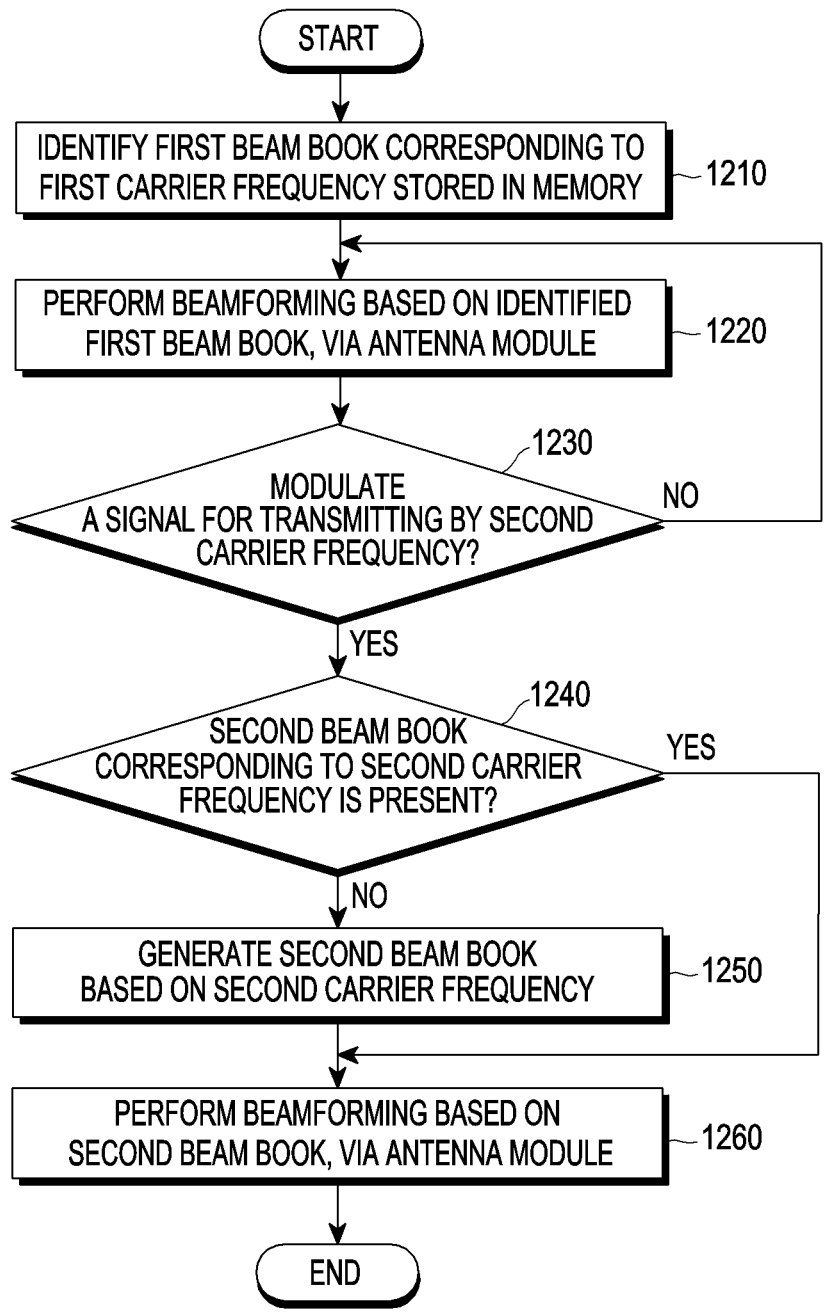
FIG. 12 is a flowchart illustrating a method for operating an electronic device according to an embodiment of the disclosure.

FIG. 12 is a flowchart illustrating a method for operating an electronic device according to an embodiment of the disclosure.

Referring to FIG. 12, the electronic device 101 (e.g., the electronic device 601 or 801 of FIG. 6 or 8) (e.g., a processor (e.g., the second communication processor 214) of the electronic device) may identify a first beam book 671 corresponding to a first carrier frequency stored in the memory 670 in operation 1210.

In operation 1220, the electronic device may perform beamforming based on the identified first beam book 671 via the third antenna module 246.

If the electronic device which used to modulate a signal for transmitting by the first carrier frequency and performs beamforming happens to modulate the signal for transmitting by a second carrier frequency and perform beamforming (yes in 1230) in operation 1230, the electronic device may identify whether the second beam book 672 corresponding to the second carrier frequency is present in the memory 670 in operation 1240. According to various embodiments, the case where the electronic device modulates into the second carrier frequency and performs beamforming may include the case where it performs a beam search in the second carrier frequency, the case where it performs a cell search in the second carrier frequency, and the case where it hands over from the first carrier frequency to the second carrier frequency and transmits and receives data, and the case in which the beamforming is carried out is not limited to a specific communication context.

Unless it is identified in operation 1240 that the second beam book 672 corresponding to the second carrier frequency is present in the memory (no in 1240), the electronic device may newly generate the second beam book 672 in which the phase value has been compensated for based on the second carrier frequency in operation 1250. In operation 1260, the electronic device may perform beamforming based on the newly generated second beam book 672 via the antenna module.

If it is identified in operation 1240 that the second beam book 672 corresponding to the second carrier frequency is present in the memory (yes in 1240), the electronic device may perform beamforming based on the second beam book 672 pre-stored in the memory in operation 1260.

According to various embodiments, if the electronic device modulates into the first carrier frequency and continues to perform beamforming (no in 1230) in operation 1230, the electronic device may continue to perform beamforming based on the first beam book 671 via the third antenna module 246 in operation 1220.

Figure 13:
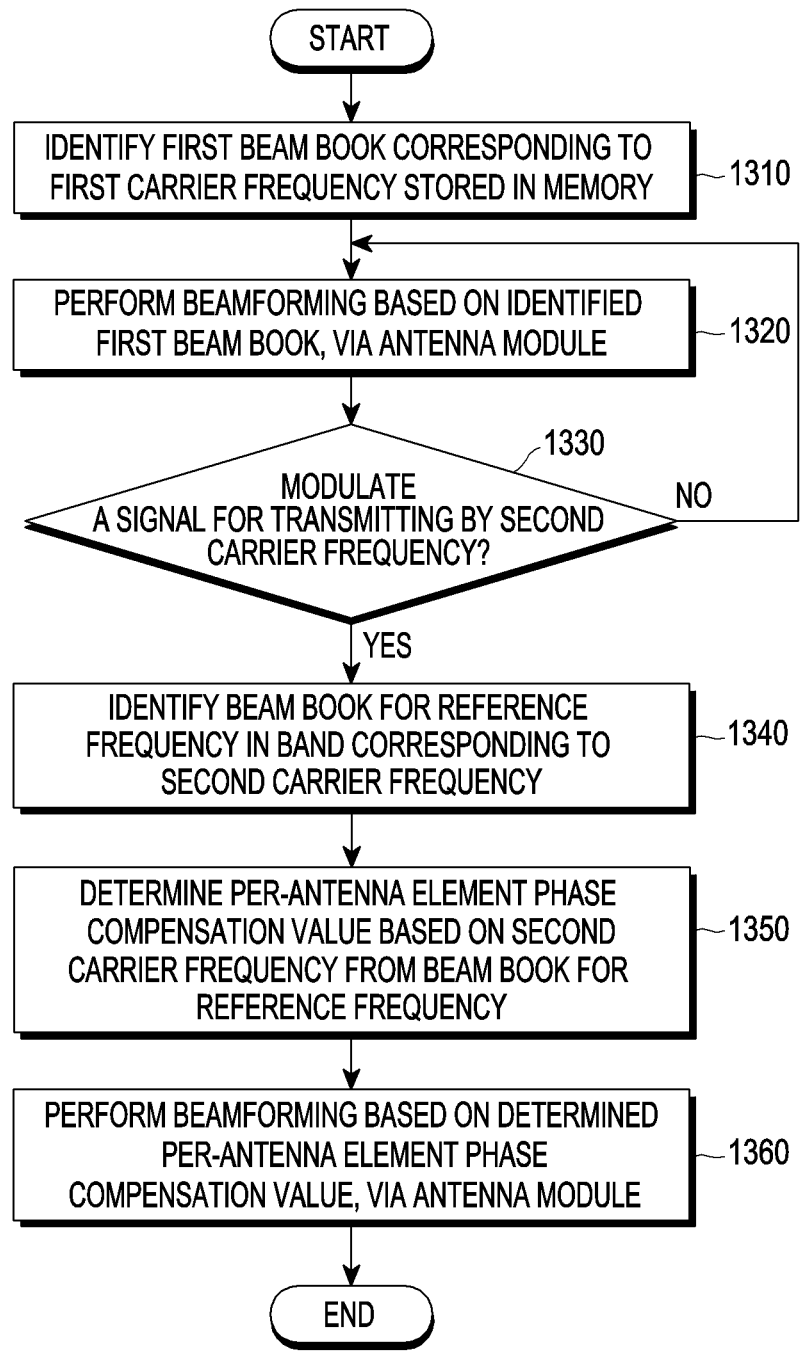
FIG. 13 is a flowchart illustrating a method for operating an electronic device according to an embodiment of the disclosure.

FIG. 13 is a flowchart illustrating a method for operating an electronic device according to an embodiment of the disclosure.

Referring to FIG. 13, the electronic device 101 (e.g., the electronic device 601 or 801 of FIG. 6 or 8) (e.g., a processor (e.g., the second communication processor 214 ) of the electronic device) may identify a first beam book 671 corresponding to a first carrier frequency stored in the memory 670 in operation 1310.

In operation 1320, the electronic device may perform beamforming based on the identified first beam book 671 via the third antenna module 246.

If the electronic device which used to modulate a signal for transmitting by the first carrier frequency and performs beamforming happens to modulate the signal for transmitting by a second carrier frequency and perform beamforming (yes in 1330) in operation 1330, the electronic device may identify a reference frequency configured for the frequency band corresponding to the second carrier frequency in operation 1340. The electronic device may identify the beam book corresponding to the reference frequency stored in the memory 670. According to various embodiments, the case where the electronic device modulates into the second carrier frequency and performs beamforming may include the case where it performs a beam search in the second carrier frequency, the case where it performs a cell search in the second carrier frequency, and the case where it hands over from the first carrier frequency to the second carrier frequency and transmits and receives data, and the case in which the beamforming is carried out is not limited to a specific communication context.

In operation 1350, the electronic device may determine the phase compensation value per antenna element, based on the second carrier frequency from the beam book for the reference frequency.

In operation 1360, the electronic device may perform beamforming based on the identified phase compensation value per antenna element, via the antenna module.

According to various embodiments, if the electronic device modulates into the first carrier frequency and continues to perform beamforming (no in 1330) in operation 1330, the electronic device may continue to perform beamforming based on the first beam book 671 via the third antenna module 246 in operation 1320.

An Example 16 of the disclosure may be a method, wherein the method of beamforming by an electronic device may comprise, in response to modulating a signal for transmitting by a first carrier frequency, identifying a first beam book corresponding to the first carrier frequency stored in a memory, the first beam book including information related to a first phase value corresponding to each of antenna elements included in an antenna module, performing beamforming based on the identified first beam book via the antenna module, in response to modulating the signal for transmitting by a second carrier frequency different from the first carrier frequency, identifying a second beam book corresponding to the second carrier frequency, the second beam book including information related to a second phase value corresponding to each of antenna elements, the second phase value is a value compensated from the first phase value based on the second carrier frequency, and performing beamforming based on the identified second beam book via the antenna module.

An Example 17 may be a method in accordance with example 16, or with any other example described herein, wherein the second beam book may be determined further considering an interval between the antenna elements.

An Example 18 may be a method in accordance with example 16 or example 17, or with any other example described herein, wherein according to various embodiments, the second beam book may be determined further considering an effective distance between phase shifters each of which corresponds to a respective one of the antenna elements.

An Example 19 may be a method in accordance with example 16 to example 18, or with any other example described herein, wherein the second beam book may be determined further considering a direction in which each antenna element is oriented.

An Example 20 may be a method in accordance with example 16 to example 19, or with any other example described herein, wherein the method may further comprise, when the second beam book corresponding to the second carrier frequency is not present, generating the second beam book including information related to the second phase value in which the first phase value corresponding to each antenna element has been compensated for based on the second carrier frequency.

An Example 21 of the disclosure may be an electronic device, wherein the electronic device 101 may comprise an antenna means (e.g., an antenna, an antenna circuit, or the third antenna module 246), a storage medium (e.g., internal memory 136, external memory 138, or a memory 670), and a processing means (e.g., a communication processor, a modem, a communication circuitry, processor 120 or 214) configured to, in response to modulating a signal for transmitting by a first carrier frequency, identify a first beam book 671 corresponding to the first carrier frequency stored in the memory, the first beam book including information related to a first phase value corresponding to each of antenna elements included in the antenna means, perform beamforming based on the identified first beam book via the antenna means, in response to modulating the signal for transmitting by a second carrier frequency different from the first carrier frequency, identify a second beam book 672 corresponding to the second carrier frequency, the second beam book including information related to a second phase value corresponding to each of antenna elements, the second phase value is a value compensated from the first phase value based on the second carrier frequency, and perform beamforming based on the identified second beam book via the antenna means.

An Example 22 may be an electronic device in accordance with example 21, or with any other example described herein, wherein the second beam book may be determined further considering an interval between the antenna elements.

An Example 23 may be an electronic device in accordance with example 21 or example 22, or with any other example described herein, wherein the second beam book may be determined further considering an effective distance between phase shifters each of which corresponds to a respective one of the antenna elements.

An Example 24 may be an electronic device in accordance with example 21 to example 23, or with any other example described herein, wherein the second beam book may be determined further considering a direction in which each antenna element is oriented.

An Example 25 may be an electronic device in accordance with example 21 to example 24, or with any other example described herein, wherein the processing means may be further configured to, when the second beam book corresponding to the second carrier frequency is not present, generate the second beam book including information related to the second phase value in which the first phase value corresponding to each antenna element has been compensated for based on the second carrier frequency.

An Example 26 may be an electronic device in accordance with example 21 to example 25, or with any other example described herein, wherein the processing means may be further configured to, when the second beam book corresponding to the second carrier frequency is not present, identify a reference frequency in a frequency band corresponding to the second carrier frequency and generate the second beam book including information related to the second phase value in which the first phase value corresponding to each antenna element has been compensated for based on the second carrier frequency from a beam book configured for the reference frequency.

An Example 27 of the disclosure may be an electronic device, wherein the electronic device may comprise an antenna means (e.g., an antenna, an antenna circuit, or the third antenna module 246 ), a storage medium (e.g., internal memory, external memory, or a memory 670 ), and a processing means (e.g., a communication processor, a modem, a communication circuitry, processor 120 or 214 ) configured to, in response to modulating a signal for transmitting by a first carrier frequency, identify a beam book corresponding to the first carrier frequency stored in the memory, the beam book including information related to a phase value corresponding to each of antenna elements included in the antenna means, perform beamforming based on the identified beam book via the antenna means, in response to modulating the signal for transmitting by a second carrier frequency different from the first carrier frequency, identify a phase compensation value per antenna element, determined based on the second carrier frequency from each phase value included in the beam book, and perform beamforming based on the identified phase compensation value per antenna element, via the antenna module.

An Example 28 may be an electronic device in accordance with example 27, or with any other example described herein, wherein the phase compensation value may be determined further considering an interval between the antenna elements.

An Example 29 may be an electronic device in accordance with example 27 or example 8, or with any other example described herein, wherein the phase compensation value may be determined further considering an effective distance between phase shifters each of which corresponds to a respective one of the antenna elements.

An Example 30 may be an electronic device in accordance with example 27 to example 29, or with any other example described herein, wherein the phase compensation value may be determined further considering a direction in which each antenna element is oriented.

An Example 31 of the disclosure may be an electronic device, wherein the electronic device may comprise an antenna means (e.g., an antenna, an antenna circuit, or the third antenna module 246), a storage medium (e.g., internal memory, external memory, or a memory 670), and a processing means (e.g., a communication processor, a modem, a communication circuitry, processor 120 or 214) configured to, in response to modulating a signal for transmitting by a first carrier frequency, identify a first beam book corresponding to the first carrier frequency stored in the storage medium , the first beam book including information related to a phase value corresponding to each of antenna elements included in the antenna means, perform beamforming based on the identified first beam book via the antenna means, in response to modulating the signal for transmitting by a second carrier frequency different from the first carrier frequency, identify a reference frequency in a frequency band corresponding to the second carrier frequency, identify a phase compensation value per antenna element, determined based on the second carrier frequency from each phase value included in a beam book configured for the reference frequency, and perform beamforming based on the identified phase compensation value per antenna element, via the antenna means.

An Example 32 may be an electronic device in accordance with example 31, or with any other example described herein, wherein the reference frequency in the frequency band may include at least one of a lowest frequency in the frequency band, a highest frequency in the frequency band, or a center frequency in the frequency band.

An Example 33 may be an electronic device in accordance with example 31 or example 32, or with any other example described herein, wherein the phase compensation value may be determined further considering an interval between the antenna elements.

An Example 34 may be an electronic device in accordance with example 31 to example 33, or with any other example described herein, wherein the phase compensation value may be determined further considering an effective distance between phase shifters each of which corresponds to a respective one of the antenna elements.

An Example 35 may be an electronic device in accordance with example 31 to example 34, or with any other example described herein, wherein the phase compensation value may be determined further considering a direction in which each antenna element is oriented.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

As is apparent from the foregoing description, according to various embodiments, it is possible to allow the beam actually formed by a UE to be oriented in the direction intended upon creating a beam book by predicting and compensating for an additional phase variation per antenna which occurs due to a difference in carrier frequency, considering, in-real time, a difference between the carrier frequency being currently used for signal transmission/reception with a base station and the carrier frequency used upon creating the beam book when an electronic device using beamforming performs beamforming. Various embodiments may overcome a reduction in beamforming gain due to a difference in carrier frequency and thus enhance the transmission rate upon data transmission/reception.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an antenna module;
a memory; and
at least one processor configured to:
in response to modulating a signal for transmitting by a first carrier frequency, identify a first beam book corresponding to the first carrier frequency stored in the memory, the first beam book including information related to a first phase value corresponding to each of antenna elements included in the antenna module,
perform beamforming based on the identified first beam book via the antenna module,
in response to modulating the signal for transmitting by a second carrier frequency different from the first carrier frequency, identify a second beam book corresponding to the second carrier frequency, the second beam book including information related to a second phase value corresponding to each of the antenna elements, the second phase value is a value compensated from the first phase value based on the second carrier frequency, and
perform beamforming based on the identified second beam book via the antenna module.

2. The electronic device of claim 1, wherein the second beam book is determined further considering an interval between the antenna elements.

3. The electronic device of claim 1, wherein the second beam book is determined further considering an effective distance between phase shifters each of which corresponds to a respective one of the antenna elements.

4. The electronic device of claim 1, wherein the second beam book is determined further considering to a direction in which each antenna element is oriented.

5. The electronic device of claim 1, wherein the at least one processor is further configured to:
when the second beam book corresponding to the second carrier frequency is not present, generate the second beam book including information related to the second phase value in which the first phase value corresponding to each antenna element has been compensated for based on the second carrier frequency.

6. The electronic device of claim 1, wherein the at least one processor is further configured to:
when the second beam book corresponding to the second carrier frequency is not present, identify a reference frequency in a frequency band corresponding to the second carrier frequency, and
generate the second beam book including information related to the second phase value in which the first phase value corresponding to each antenna element has been compensated for based on the second carrier frequency from a beam book configured for the reference frequency.

7. An electronic device comprising:
an antenna module;
a memory; and
at least one processor configured to:
in response to modulating a signal for transmitting by a first carrier frequency, identify a beam book corresponding to the first carrier frequency stored in the memory, the beam book including information related to a phase corresponding to each of antenna elements included in the antenna module,
perform beamforming based on the identified beam book via the antenna module,
in response to modulating the signal for transmitting by a second carrier frequency different from the first carrier frequency, identify a phase compensation value per antenna element, determined based on the second carrier frequency from each phase value included in the beam book, and
perform beamforming based on the identified phase compensation value per antenna element, via the antenna module.

8. The electronic device of claim 7, wherein the phase compensation value is determined further considering an interval between the antenna elements.

9. The electronic device of claim 7, wherein the phase compensation value is determined further considering an effective distance between phase shifters each of which corresponds to a respective one of the antenna elements.

10. The electronic device of claim 7, wherein the phase compensation value is determined further considering a direction in which each antenna element is oriented.

11. An electronic device comprising:
an antenna module;
a memory; and
at least one processor configured to:
in response to modulating a signal for transmitting by a first carrier frequency, identify a first beam book corresponding to the first carrier frequency stored in the memory, the first beam book including information related to a phase value corresponding to each of antenna elements included in the antenna module,
perform beamforming based on the identified first beam book via the antenna module,
in response to modulating the signal for transmitting by a second carrier frequency different from the first carrier frequency, identify a reference frequency in a frequency band corresponding to the second carrier frequency,
identify a phase compensation value per antenna element, determined based on the second carrier frequency from each phase value included in a beam book configured for the reference frequency, and
perform beamforming based on the identified phase compensation value per antenna element, via the antenna module.

12. The electronic device of claim 11, wherein the reference frequency in the frequency band includes at least one of a lowest frequency in the frequency band, a highest frequency in the frequency band, or a center frequency in the frequency band.

13. The electronic device of claim 11, wherein the phase compensation value is determined further considering an interval between the antenna elements.

14. The electronic device of claim 11, wherein the phase compensation value is determined further considering an effective distance between phase shifters each of which corresponds to a respective one of the antenna elements.

15. The electronic device of claim 11, wherein the phase compensation value is determined further considering a direction in which each antenna element is oriented.

16. A method of beamforming by an electronic device, the method comprising:
in response to modulating a signal for transmitting by a first carrier frequency, identifying a first beam book corresponding to the first carrier frequency stored in a memory, the first beam book including information related to a first phase value corresponding to each of antenna elements included in an antenna module;

performing beamforming based on the identified first beam book via the antenna module;

in response to modulating the signal for transmitting by a second carrier frequency different from the first carrier frequency, identifying a second beam book corresponding to the second carrier frequency, the second beam book including information related to a second phase value corresponding to each of the antenna elements, the second phase value is a value compensated from the first phase value based on the second carrier frequency; and performing beamforming based on the identified second beam book via the antenna module.

17. The method of claim 16, wherein the second beam book is determined further considering an interval between the antenna elements.

18. The method of claim 16, wherein the second beam book is determined further considering an effective distance between phase shifters each of which corresponds to a respective one of the antenna elements.

19. The method of claim 16, wherein the second beam book is determined further considering to a direction in which each antenna element is oriented.

20. The method of claim 16, further comprising:

when the second beam book corresponding to the second carrier frequency is not present, generating the second beam book including information related to the second phase value in which the first phase value corresponding to each antenna element has been compensated for based on the second carrier frequency.

* * * * *